(12) United States Patent
Wehrli et al.

(10) Patent No.: US 12,115,513 B2
(45) Date of Patent: Oct. 15, 2024

(54) STRUCTURED PACKING ELEMENT WITH REDUCED MATERIAL REQUIREMENT

(71) Applicant: Sulzer Management AG, Winterthur (CH)

(72) Inventors: Marc Wehrli, Brütten (CH); Ilja Ausner, Oehningen (DE); Florian Kehrer, Illnau-Effretikon (CH); Markus Duss, Winterthur (CH)

(73) Assignee: SULZER MANAGEMENT AG, Winterthur (CH)

( * ) Notice: Subject to any disclaimer, the term of this patent is extended or adjusted under 35 U.S.C. 154(b) by 0 days.

(21) Appl. No.: 17/768,432

(22) PCT Filed: Sep. 28, 2020

(86) PCT No.: PCT/EP2020/077148
§ 371 (c)(1),
(2) Date: Apr. 12, 2022

(87) PCT Pub. No.: WO2021/073860
PCT Pub. Date: Apr. 22, 2021

(65) Prior Publication Data
US 2024/0116022 A1    Apr. 11, 2024

(30) Foreign Application Priority Data
Oct. 14, 2019  (EP) ..................................... 19202985

(51) Int. Cl.
*B01J 19/32*    (2006.01)

(52) U.S. Cl.
CPC ...... *B01J 19/32* (2013.01); *B01J 2219/32213* (2013.01); *B01J 2219/32227* (2013.01);
(Continued)

(58) Field of Classification Search
CPC .............. B01J 19/32; B01J 2219/32213; B01J 2219/32227; B01J 2219/32262;
(Continued)

(56) References Cited

U.S. PATENT DOCUMENTS 3,325,155 A * 6/1967 Rene ........................ B01D 3/22
137/513.5
4,296,050 A 10/1981 Meier
(Continued)

FOREIGN PATENT DOCUMENTS

CA 1270751 A 6/1990
CA 2879264 A1 1/2014
(Continued)

OTHER PUBLICATIONS

European Search Report issued Apr. 21, 2020 in corresponding European Application No. 19202985.8.
(Continued)

*Primary Examiner* — Christopher P Jones
*Assistant Examiner* — Phillip Y Shao
(74) *Attorney, Agent, or Firm* — Global IP Counselors, LLP

(57) ABSTRACT

A structured packing element for a column for at least one of mass transfer and heat exchange between a heavy fluid phase and a light fluid phase. The structured packing element comprises at least two layers of a grid comprising openings that are surrounded and separated from each other by separating elements. At least two of the layers are arranged in a longitudinal direction parallel and in touching contact with each other such that an open space extending from one end to an opposite end of the layers is provided between the layers such that at least one of the heavy fluid phase and the light fluid phase may flow therethrough. An average width of at least 50% of the separating elements (Continued)

between adjacent openings is at least 15 times a layer material thickness and is between 70% and 125% of an average hydraulic diameter of the adjacent openings.

14 Claims, 18 Drawing Sheets

(52) U.S. Cl.
CPC .............. *B01J 2219/32262* (2013.01); *B01J 2219/32286* (2013.01)

(58) Field of Classification Search
CPC ...... B01J 2219/32286; B01J 2219/3221; B01J 2219/32237; B01J 2219/32248; B01J 2219/32289; B01J 2219/3288; B01J 2219/332
See application file for complete search history.

(56) References Cited

U.S. PATENT DOCUMENTS

| | | | |
|---|---|---|---|
| 4,304,738 A | 12/1981 | Nutter | |
| 4,501,707 A | 2/1985 | Bühlmann | |
| 4,762,650 A | 8/1988 | Bosman | |
| 4,981,621 A | 1/1991 | Pluss | |
| 5,204,027 A * | 4/1993 | Armstrong | F28F 25/087 261/112.2 |
| 5,762,668 A * | 6/1998 | Lee | B01D 3/324 55/486 |
| 5,885,694 A | 3/1999 | Schultes | |
| 5,921,109 A | 7/1999 | Billingham et al. | |
| 6,206,349 B1 | 3/2001 | Parten | |
| 6,974,769 B2 | 12/2005 | Basol et al. | |
| 7,434,794 B2 | 10/2008 | Kehrer et al. | |
| 2001/0026876 A1 * | 10/2001 | Kessler | B01J 19/32 428/606 |
| 2012/0248635 A1 * | 10/2012 | Wolf | F28F 13/12 261/108 |
| 2016/0121297 A1 | 5/2016 | Wehrli | |
| 2018/0318787 A1 * | 11/2018 | Clifford | B01J 19/32 |
| 2018/0353927 A1 * | 12/2018 | Nieuwoudt | B01J 19/32 |

FOREIGN PATENT DOCUMENTS

| | | |
|---|---|---|
| CN | 88200252 U | 9/1988 |
| DE | 1253673 | 11/1967 |
| DE | 3818917 C1 | 7/1989 |
| EP | 0069241 A1 | 1/1983 |
| EP | 0250061 A1 | 12/1987 |
| EP | 0995958 B1 | 5/2004 |
| EP | 1477224 A1 | 11/2004 |
| EP | 2878357 A1 | 6/2015 |
| GB | 1004046 | 9/1965 |
| GB | 1569828 | 6/1980 |
| RU | 2184606 C2 | 7/2002 |
| WO | 2014195233 A1 | 12/2014 |

OTHER PUBLICATIONS

International Preliminary Report on Patentability issued Apr. 28, 2022 in corresponding International Application No. PCT/EP2020/077148.
International Search Report issued Nov. 19, 2020 in corresponding International Application No. PCT/ EP2020/077148.
Database WPI, Week 200260, 2002, Thomson Scientific, London, GB; AN 2002-564584, XP 2798293.

* cited by examiner

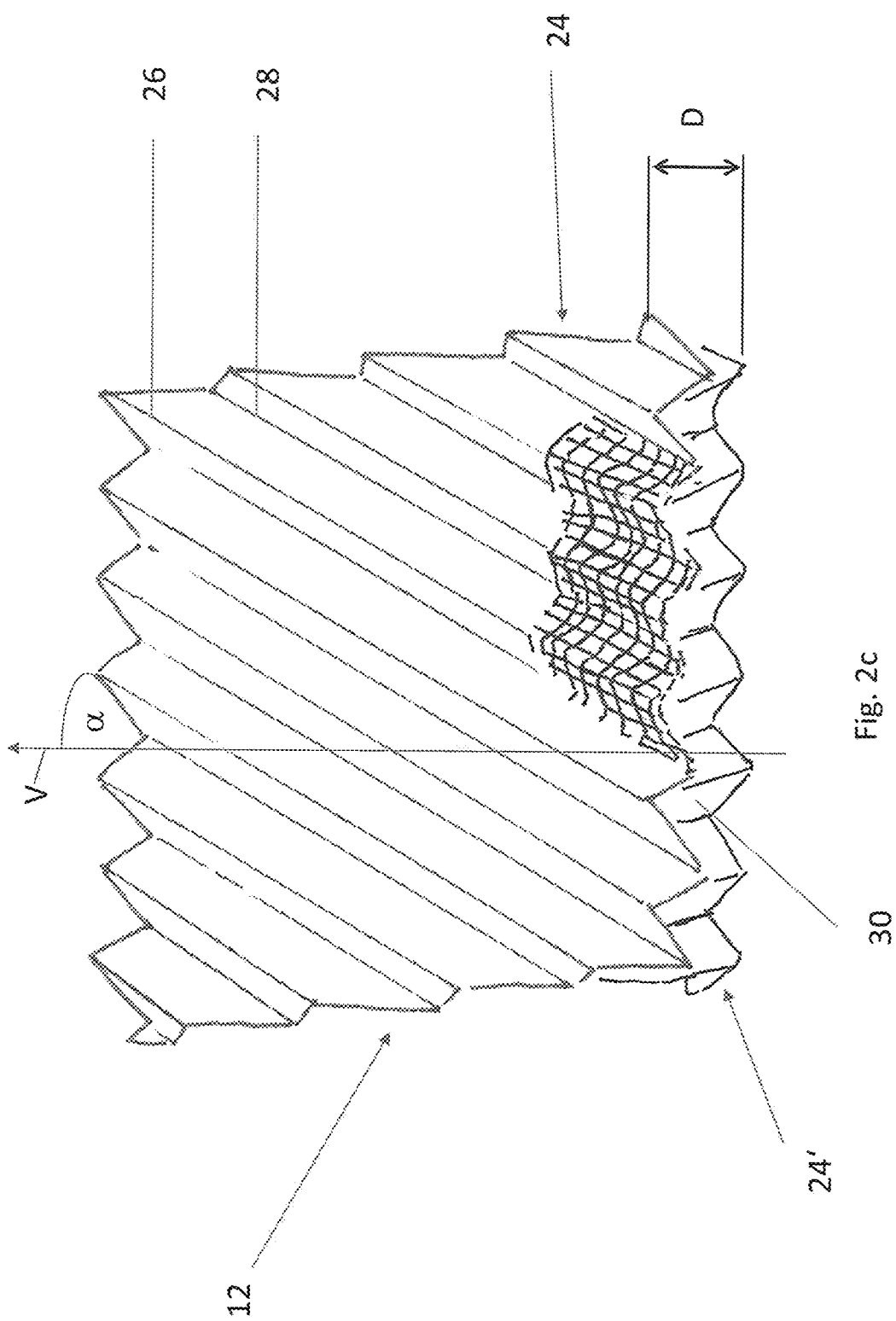

STRUCTURED PACKING ELEMENT WITH REDUCED MATERIAL REQUIREMENT

CROSS-REFERENCE TO RELATED APPLICATION

This application is a U.S. National Stage application of International Application No. PCT/EP2020/077148, filed Sep. 28, 2020, which claims priority to European Patent Application No. 19202985.8, filed Oct. 14, 2019, the contents of each of which are hereby incorporated by reference.

FIELD OF THE INVENTION

The present disclosure relates to a structured packing element for a column for mass transfer and/or heat exchange between a heavy fluid phase and a light fluid phase.

BACKGROUND INFORMATION

Structured packing elements are used in mass transfer columns, such as for instance in fractionation columns, distillation columns, absorption columns, extraction columns or flue gas scrubbers. The structured packing elements serve for the improvement of the mass transfer and/or heat transfer between at least two fluid phases of different densities, wherein the structured packings elements are typically operated in counter-current flow. While in distillation and absorption applications, the light phase is a gas or vapor and the heavy phase is a condensate or liquid, in extraction processes both phases are liquids with different densities. The structured packing elements comprise a plurality of different layers, each providing surface area for the heavier phase that trickles down along the surface of the layer and spreads. In addition, between the different layers of the structured packing elements, open spaces are provided which are filled with the light phase (e.g. vapor or gas in distillation) and provide a path for the light phase to ascend, while it is driven by a pressure gradient. The pressure gradient is required to overcome the flow resistance. In the typical case of counter-current mass transfer, the average flow direction of the light phase is from bottom to top of the structured packing element and thus opposite to the average flow direction of the heavy phase. By allowing the one heavy phase to spread on the surface of the structured packing element, an interface is created between the at least two phases so that an efficient heat and mass transfer between the phases is established at the interface. There may also be applications with more than one heavy phase. An example is extractive distillation.

SUMMARY

A mass transfer column usually comprises several beds of structured packing elements. Typically, a distributor is arranged on top of each bed to evenly distribute the heavy phase over the cross-section of the bed, while leaving enough space for the light phase to ascend through it. Moreover, often a grid-like holding device and a collector are arranged below each bed, wherein the grid-like structure keeps the bed at its position and the collector collects the heavy phase trickling down from the bed, while sufficient open space is left in the collector for the light phase to ascend.

A common type of structured packing element is the so-called cross-channel corrugated sheet packing, which is assembled from a plurality of corrugated sheets, which are arranged parallel and in touching contact with each other. Typically, the corrugated metal sheets are fixed to each other by means of several rods penetrating the corrugated sheets perpendicular to the longitudinal section of the corrugated sheets, wherein the rods are fixed with the first and last corrugated sheet using a washer and a nut or by bending the rod. Each corrugated sheet comprises a plurality of alternately oriented peaks and valleys, wherein adjacent corrugated sheets are oriented such that the corrugations of the adjacent corrugated sheets intersect in crisscross fashion with the corrugations of the corrugated sheets extending obliquely relative to the vertical or longitudinal direction, thus forming inclined channels which continuously cross one another. These channels positively influence the flows of the gas phase and of the liquid phase within the packing and facilitate the mass transfer between the phases. That is, the gas phase and the liquid phase are brought into contact in the channels of the structured packing element and the mass transfer as well as the heat transfer between the phases is thus facilitated. More specifically, ascending gas comes into contact with liquid, which is present on the surface of the sheets forming the channels when it flows downwardly through the mass transfer column. During this contact, a component enriched in the gas can transfer into the liquid and vice versa; this means that an efficient mass transfer can take place. Such packings are described for example in DE 1 253 673, in CA 1270751 and in U.S. Pat. No. 6,206,349 B1.

The amount of mass transfer per unit time is proportional to the area of the interface between the gas and the liquid, wherein the area of the interface gets larger with an increasing portion of the surface of the packing element's layers which is wetted by the liquid. Cross-channel corrugated sheet packings made of metal gauze are known to have an excellent wettability thanks to a good spreading of the heavy phase on the surface of the corrugated sheets due to capillary force of the metal gauze and, thus, on account of the excellent wettability, a high mass transfer efficiency. Examples of such structured packing elements are the Sulzer packing types BX and CY, which had been first presented in the 1960s. Another example of such a structured packing element is described in EP 1 477 224 A1. However, metal wire gauze is an expensive material. On account of this, it has been tried to replace the gauze material by a corrugated metal sheet with a large number of small openings. An example is the commercially available Montz-Pak Type BSH. During operation of the mass transfer column the openings of this packing are filled with the heavy phase due to the capillary force. The wettability of such corrugated, relatively finely structured perforated metal sheets is worse than that of the packings based on metal gauze, and the production of the sheet is still relatively expensive, partly due to the slow production process associated with the fine structure.

As set out above, it is important for a high mass transfer efficiency that the surface of the structured packing element is well covered by liquid, since failure results in a waste of packing material as the light phase is not as much in contact with the heavy phase as it could be given the physical area of the packing. Alternative suggestions to promote the spreading of the heavy phase over the surface of the layers—instead of using metal gauze or corrugated, very fine expanded metal sheets as material for the structured packing element—are to provide the layers with perforation and another surface texture, such as described in U.S. Pat. No. 4,296,050, in GB 1,569,828, in U.S. Pat. No. 4,981,621 and in EP 3 003 550 A1.

In order to further improve the use of the surface of the structured packing element it has been proposed in DE 38 18917 C1 and in CN 882 00252 U to provide cross-channel corrugated sheet packings made of perforated layers having a high void fraction, i.e. a high ratio of the total area of the openings in the layer divided by the sheet area of the layer. More specifically, DE 38 18917 C1 discloses structured packing elements made of sheet layers comprising openings, which are separated from each other by separating elements. The edges of the openings are provided with protruding rims, wherein the rims of adjacent openings are alternating extending upwardly from the upper side of the surface and downwardly from the lower side of the surface of the sheet layers. DE 38 18917 C1 also teaches that the openings of the layers shall be 3 to 7 times larger than the width of the separating elements located between the adjacent openings. This results in a structured packing element made of open metal sheets with very high void fraction on the order 50% or more. CN 882 00252 U discloses a structured packing element made of perforated sheets having a thickness of 0.1 to 0.5 mm. The openings have a rhombic shape, wherein the width of the openings is between 2 and 3 mm and wherein the percentage of open area on the sheet, i.e. the void fraction, is 40% to 50%. Thus, both reference documents teach to provide structural packing elements comprising sheet layers having rather high void fractions of more than 40% and preferably of about 50%. In contrast thereto, classical structured packing elements have drastically lower void fractions of at most 10%.

Structured packing elements based on another principle than cross-channel corrugated sheet packings are for instance described in EP 0 069 241 A1, in U.S. Pat. No. 4,304,738 and in EP 0 250 061 A1. The layers of these structured packing elements consist of expanded sheet metal, wherein the layers assume a certain layer width due to the expansion process. However, in contrast to cross-channel corrugated sheet packings, the layers of these structured packing elements are not corrugated and not deformed except for the deformation that comes along with the expansion process. This limits the open space for the ascending vapor. Therefore, the mass transfer efficiency is not optimal, because the open space between the layers does not provide a well-defined path driving the ascending vapor in a way that promotes a homogeneous distribution over the whole cross-section plane of the structured packing element. It would be desirable to impose on the vapor a certain direction by means of an additional degree of freedom when defining the shape of the packing.

Apart from a high mass transfer efficiency, capacity is an important aspect for a structured packing element. As the flow rates of the light and heavy phases in a structured packing element increase, the pressure drop in the structured packing element increases. At a certain pressure drop, gravity is not strong enough to counteract the friction between the two phases and the heavy phase or liquid, respectively, is entrained in the light phase or gas, respectively, and thus cannot descend anymore along the structured packing element. At this point, the mass transfer breaks down and this situation is called flooding. This flooding point determines the capacity of a structured packing element, i.e. the capacity of a structured packing element is characterized by pairs of maximum flow rates of the counter-current phases beyond which an increase of either of the two flow rates leads to flooding. The flooding point relates to a characteristic pressure drop, which is generally on the order of 10 mbar per meter packing height.

It would be optimal for a structured packing element to have an excellent mass transfer efficiency as well as an excellent capacity, because this would allow reduction of the diameter and/or height of the mass transfer column at a given capacity, thereby minimizing the investment costs for the mass transfer column. However, these two characteristics depend on opposite trends with regard to the specific area and other geometrical parameters. More specifically, a high specific area, i.e. a high quotient of the geometrical area of the structured packing element divided by the volume it occupies, leads to an intensive contact between the light and heavy phases, which is why a respective structured packing element has a high mass transfer efficiency, which is commonly expressed in terms of number of theoretical stages per meter packing height NTSM. However, a structured packing element with a high specific area is characterized by a high flow resistance for the light phase, which is why a respective structured packing element has—at a given flow rate of the light phase—a higher pressure drop per packing height and thus a lower capacity than a packing with a lower specific area.

In view of the above, the object underlying the present disclosure is to provide a cost efficient multi-purpose structured packing element having a higher mass transfer efficiency at a given capacity or a higher capacity at a given mass transfer efficiency or a lower weight at a given mass transfer efficiency, respectively.

In accordance with an embodiment of the present disclosure, this object is satisfied by providing a structured packing element for a column for at least one of mass transfer and heat exchange between a heavy fluid phase and a light fluid phase, the structured packing element comprising: at least two layers of a grid comprising openings that are surrounded and separated from each other by separating elements, wherein at least two of the at least two layers are arranged in a longitudinal direction of the structured packing element parallel and in touching contact with each other such that an open space extending from one end to an opposite end of the at least two layers is provided between the at least two layers such that at least one of the heavy fluid phase and the light fluid phase may flow therethrough, wherein an average width of at least 50% of the separating elements between adjacent ones of the openings is at least 15 times a layer material thickness and is between 70% and 125% of an average hydraulic diameter of the adjacent ones of the openings, wherein a maximum distance between at least two of the at least two layers measured in a plane perpendicular to the longitudinal direction is at least 4 times larger than the average width of the separating elements, wherein the average width of one of the separating elements is determined by dividing up the one of the separating elements into individual sections each having a section length $d_i$, wherein for each of the individual sections a shortest distance $b_i$ between adjacent edges within the individual sections is measured and a sum of products $d_i \cdot b_i$ is divided by a sum of $d_i$ to yield the average width b of the one of the separating elements, and the layer material thickness is a thickness of a material of one of the at least two layers and is measured at an outer edge of the at least two layers with a micrometer screw.

This solution is based on the surprising finding that the mass transfer efficiency at a given capacity can be significantly improved, if the average width of the separating elements between adjacent openings is relatively large compared to the openings (namely, between 70% and 125% of the hydraulic diameter of the adjacent openings) and significantly wider than the layer material thickness (namely, 15 times or more). This was in particular unexpected, because it is in contradiction to the teaching of DE 38 18917 C1 and CN 882 00252 U. The two documents imply that a free film hanging between the separating elements contributes twice to the mass transfer area and thus suggest further minimizing the width of the separating elements and removing even more of the physical area. In view of this, it was even more surprising that by increasing the ratio of the average width of the separating elements between adjacent openings divided by the hydraulic diameter of the adjacent openings in comparison to the ratios taught in the aforementioned documents, the mass transfer efficiency at a given capacity is significantly improved.

A further significant advantage of the structured packing element in accordance with an embodiment of the present disclosure is that it is not at all based on the use of expensive layer material. Rather, the grid of the layers can be simply produced of expanded sheet material, i.e. by cutting and stretching a thin metal plate and then deforming the expanded sheet metal to form, for instance, corrugated sheets. Thus, a cost-efficient raw material can be used and the required amount of material of this cost-efficient raw material is also reduced by stretching it. All in all, the present disclosure provides a cost-efficient multi-purpose structured packing element having a higher mass transfer efficiency at a given capacity or a higher capacity at a given mass transfer efficiency, respectively.

The longitudinal direction of the structured packing element is the direction from the top area to the bottom area of the structured packing element when it is incorporated in a mass transfer and/or heat exchange column, i.e. the longitudinal direction is the direction from the top to the bottom of the mass transfer and/or heat exchange column. In other words, it is the intended gravity-driven flow direction of the heavier phase during the operation of the structured packing element and mass transfer and/or heat exchange column, respectively. More specifically, the longitudinal direction of the structured packing element may be determined as follows: The structured packing element is placed on a horizontal area so that the layers of the structured packing element arranged in parallel and in touching contact with each other extend in the vertical direction and so that the open spaces (or channels, respectively, which are surrounded and thus defined by the periodic deformations of the layers) extending from one end to the opposite end of the layers extend from the top to the bottom of the structured packing element. The longitudinal direction is then the direction from the top to the bottom of the so arranged structured packing element, or—in other words: Heavy phase, for instance water, which is dropped onto the top of the so arranged structured packing element flows gravity-driven downwards along the open spaces, wherein the longitudinal direction is the average flow direction of the heavy phase.

The maximum distance (subsequently also referred to or abbreviated as "D") is closely related to the layer width (subsequently also referred to or abbreviated as "W"), which is the extension of one single layer measured in the above-mentioned plane. The value of W is typically around half of D. The open space between the two layers is obtained using the layer width W. The maximum distance D between two adjacent layers of the structured packing element measured in the plane perpendicular to the longitudinal direction denotes the distance between the layers, if the distance between the layers is constant over the entire surfaces of the adjacent layers, such as in the case of two parallel flat sheets. If the distance between the layers is not constant over the entire surfaces of the adjacent layers, i.e. if the distance between different surface portions of the layers differ, the maximum distance D between the two adjacent layers is the distance between those surface portions of both layers, where the distance in the plane being perpendicular to the longitudinal direction between both layers is maximal. More specifically, the maximum distance D between two adjacent layers of the structured packing element measured in the plane perpendicular to the longitudinal direction denotes according to the present disclosure the distance between the two most distant points A and B, whereby point A is on the first layer and point B is on the second layer. Two parallel planes are defined, one comprises point A, the other point B. These two parallel planes are oriented essentially parallel to the orientation of the two layers. The distance D is defined as the distance between these two parallel planes.

In accordance with an embodiment of the present disclosure, the structured packing element comprises at least two layers arranged in the longitudinal direction parallel with each other. Parallel arrangement of two layers means in accordance with the present embodiment that one of the layers is inclined by an angle of at most +/−20°, preferably of at most +/−10°, more preferably of at most +/−5°, still more preferably of at most +/−2° with regard to the other layer and is most preferably not inclined at all with regard to the other layer.

Moreover, in accordance with the present disclosure, the average width of at least 50% of the separating elements between adjacent openings is at least 15 times the layer material thickness. This means that for at least 50% of the separating elements, the ratio between the average width of the respective separating element and the sheet material thickness is at least 15. Preferably, the ratio between the average width of at least 75%, more preferably of at least 80%, still more preferably of at least 90%, yet more preferably of at least 95% and most preferably of all of the separating elements between adjacent openings and the sheet material thickness is at least 15.

Layer material thickness means the thickness of the material, which constitutes or forms the layer, respectively. For instance, if the layer is made by a sheet, such as by an expanded sheet, the layer material thickness is the sheet thickness. Should the layer material thickness or sheet thickness respectively, vary over the area of the layer, the layer material thickness is the thickness of the material forming the layer measured at one of the outer edges of the layer by means of, for instance, a micrometer screw. For instance, the thickness of the material forming the layer is measured at at least two, preferably at at least three and more preferably at at least five locations at one or more of the outer edges with the micrometer screw, before the obtained numeric values are summed up and averaged by dividing the sum by the number of measurements. Good results are for instance obtained, when the thickness is measured at 2 to 20, preferably 2 to 10, more preferably 3 to 10 and most preferably 5 to 10 locations at one or more of the outer edges of the layer with the micrometer screw, wherein the different locations are about 3 cm distant from each other along the outer edge. A micrometer screw is a known measurement device comprising one fixed and one moveable measurement area, wherein the moveable measurement area is adjustable with a fine thread. Both measurement areas may contact or touch each other, respectively, if the moveable measurement area is completely moved to the fixed measurement area. Both measurement areas are flat and circular, wherein the diameter of both measurement areas are preferably 5 to 6 mm.

The average width (subsequently also referred to or abbreviated as "b") of a separating element is determined in accordance with an embodiment of the present disclosure by measuring the distance between the two parallel adjacent edges of the separating element, if the separating element has a uniform width. If the separating element does not have a uniform width, the average width b of a separating element is determined by dividing up the separating element into individual sections i=1, 2, 3 . . . n each having a section length $d_i$. For each of the sections, the shortest distance $b_i$ between the adjacent edges within the sections is measured. The sum of the products $d_i \cdot b_i$ divided by the sum of $d_i$ yields the average width b of the separating element. The higher the non-uniformity of the separating element, the more and shorter sections must be chosen. Preferably, the number n of individual sections i taken for the measurement per separating element is 1 to 1000, more preferably 5 to 100 and most preferably 5 to 20, such as 8 to 15. For instance, 5 sections are selected per cm of a separating element.

Preferably, the average width b of a separating element is determined on a plan view of one of the openings being adjacent to the separating element. This is advantageously achieved by taking a photographic picture of the opening. The plan view of an opening is taken along the main axis of the plane defined by the adjacent edges of the opening. In some cases, such a plane is not well defined. In this case, the most suitable view is obtained by trial and error. Several pictures, such as at least five pictures or preferably at least 10 pictures, from various angles are taken. The picture that renders the opening largest is then considered as the plan view of the opening. One reference length z may be used to determine lengths and sizes on the plan view. This is best achieved by identifying or marking a certain distance z on the real object in the neighborhood of the opening and measuring its length. The ratio between the effective length z' of this distance on the plan view and the distance z measured on the real object is used for scaling all other distances that are measured on the plan view. For example, the real length of a segment width is obtained by $b_i=b_i' \cdot (z/z')$, whereas primed variables denote the lengths measured on the plan view and non-primed variables the real length.

In accordance with an embodiment of the present disclosure, the hydraulic diameter d of an opening is calculated with the formula 4 A/P, wherein A is the cross-sectional area of the opening and P is the perimeter of the same opening. The cross-sectional area of the opening can be determined by using basic measures (such as shape length and height) and a basic geometric formula (known from Euclidean geometry), if the shape of the opening is simple, e.g. a flat triangle, rectangle, quadrilateral, trapezoid or the like. Preferably, the area is determined on a plan view of the opening. Complex shapes can be approximated and subdivided in a number j=1, 2, 3 . . . m of simple shapes having an area $A_j$. The area of these shapes can again be calculated using basic measures and basic geometric formula. The area A of the opening is obtained by summing up all areas $A_j$ determined in the opening. The more complex the shape of the opening is, the more subdivisions are required. Preferably, the number m of individual simple shape sections j taken for the measurement is 1 to 1000, preferably 5 to 100, more preferably 5 to 20, such as 8 to 15. As before, the real lengths are determined based on the ratio z/z' defined above.

The perimeter of an opening of simple shape can be determined using basic measures and basic geometric formula. In the most general case, the plan view of the opening is used. The perimeter of the opening is subdivided in a number of k=1, 2, 3 . . . K individual straight lines $P_k$ that approximate the opening best and represent it by a closed polygon. By summing up the lengths of these straight lines, the perimeter P is obtained. Again, the lengths must be translated into real lengths using the ratio z/z' as defined above.

Methods of numeric image processing may be used to determine the average width b, the area A of an opening and its perimeter P. In this case, the basic unit is determined by the size of a pixel. To translate pixel-based lengths and areas, the ratio z/z' must be defined in an appropriate way as e.g. explained above. Grey values can be used to identify pixels that belong to a separating element and others that belong to the opening. Areas can be calculated in straight forward manner by summing the pixels and multiplying the sum by the real area of a pixel (in relation to the real object). When determining the width $b_i$ or a length $d_i$ of a segment trigonometric rules must be applied if the width orientation is not parallel to the sides of the pixels.

More details about measuring methods and illustrative examples are given further below in connection with the figures.

If the grid is produced by expanding a sheet metal, i.e. by cutting and stretching a sheet material, the resulting openings are typically of rhombic shape with four approximately identical side lengths $a_1$ and short $e_2$ and long $e_1$ diagonals (also referred to as characteristic length). Thus, as schematically shown in FIG. 9, which is described in detail further below, each rhombic opening is surrounded by four separating elements having each a width b, wherein the separating elements of adjacent openings are connected with each other at junction points. The hydraulic diameter d is generally unknown, but it can be determined as set out above or calculated from the commonly used characteristic dimensions as explained below. Expanded sheets are typically characterized by the dimensions of their unit cell and the width of the separating element b. The unit cell is a quadrilateral (or rhombus) covering an opening, wherein the quadrilateral extends through midpoints of the four junction points of the separating elements. The unit cell has a short unit cell height $u_2$ and a long unit cell width $u_1$. While the short unit cell height $u_2$ is aligned with the short diagonal $e_2$ of the opening, the long unit cell height $u_1$ is aligned with the long diagonal $e_1$ of the opening. The direction of expansion, which is the direction along which the sheet metal is processed, i.e. by cutting and stretching, is typically associated with the shorter unit cell height $u_2$. The unit cell dimensions $u_1$ and $u_2$ differ from the diagonals of the opening $e_1$ and $e_2$ by a portion of the separating element, which must be added. Provided that the unit cell dimensions $u_1$, $u_2$ and the width b of the separating element are specified, the following equations are used to determine the hydraulic diameter d of the respective opening:

$$e_1 = u_1 - b\sqrt{(1+u_1^2/u_2^2)}$$

$$e_2 = e_1 \cdot u_2/u_1$$

$$d = e_1 \cdot e_2/\sqrt{(e_1^2+e_2^2)}$$

If the ratio of $e_2/e_1$ is around 0.5 or below, as it is realistic for expanded metal sheets, the following simplified equations for $e_1$ and $e_2$ may be used to determine the hydraulic diameter d of the respective opening:

$$e_1 = u_1 - b \cdot u_1/u_2$$

$$e_2 = u_2 - b$$

Furthermore, expanded metal sheet can be characterized by means of the stretching factor, which is defined as $u_2/2b$.

The inverse of the stretching is a good indication of the material savings that can be realized compared to a solid metal sheet. More details about these dimensions with an illustrative example are given further below in connection with the figures.

In an embodiment of the present disclosure, it is suggested that the average width b of at least 75%, more preferably of at least 80%, still more preferably of at least 90%, yet more preferably of at least 95% and most preferably of all separating elements between adjacent openings is between 70% and 125% of the average hydraulic diameter d of the adjacent openings. More preferably, the average width b of at least 50%, preferably of at least 75%, more preferably of at least 80%, still more preferably of at least 90%, yet more preferably of at least 95% and most preferably of all separating elements between adjacent openings is between 75% and 100% of the average hydraulic diameter d of the adjacent openings.

In order to achieve an optimal spreading of the heavy phase on the layer surface, it is preferred that the average width b of at least 50%, preferably of at least 75%, more preferably of at least 80%, still more preferably of at least 90%, yet more preferably of at least 95% and most preferably of all separating elements between adjacent openings is 1.5 to 4.0 mm. More preferably, the average width b of at least 50%, preferably of at least 75%, more preferably of at least 80%, still more preferably of at least 90%, yet more preferably of at least 95% and most preferably of all separating elements between adjacent openings is 1.6 to 3.5 mm and most preferably 1.8 to 3.0 mm.

In accordance with an embodiment of the present disclosure, the average width b of at least 50% of the separating elements between adjacent openings is at least 15 times the layer material thickness (subsequently also referred to or abbreviated as "s"). Particularly good results are obtained when the average width b of at least 50% of the separating elements between adjacent openings is at least 18 times the layer material thickness s.

In another embodiment of the present disclosure, it is suggested that the average width b of at least 50%, preferably of at least 75%, more preferably of at least 80%, still more preferably of at least 90%, yet more preferably of at least 95% and most preferably of all separating elements is at least 15 times and preferably at least 18 times the layer material thickness s.

In accordance with an embodiment of the present disclosure, the maximum distance D between at least two adjacent of the at least two layers measured in the plane being perpendicular of the longitudinal direction is at least 4 times larger than the average width b of the separating elements. This means that the ratio between the maximum distance D between at least two adjacent of the at least two layers measured in the plane being perpendicular of the longitudinal direction and the average width b of at least 50%, preferably of at least 75%, more preferably of at least 80%, still more preferably of at least 90%, yet more preferably of at least 95% and most preferably of all of the separating elements is at least 4. Particularly good results are obtained, when the maximum distance measured in the plane perpendicular to the longitudinal direction is at least 4 times larger than the average width of the separating elements between at least 50%, preferably between at least 75%, more preferably between at least 80%, still more preferably between at least 90%, yet more preferably between at least 95% and most preferably between all of the at least two layers.

Moreover, it is preferred that the maximum distance D between at least 50%, preferably between at least 75%, more preferably between at least 80%, still more preferably between at least 90%, yet more preferably between at least 95% and most preferably between all of the at least two layers measured in the plane perpendicular to the longitudinal direction is at least 5 times and more preferably at least 8 times larger than the average width b of the separating elements.

In a further embodiment of the present disclosure, it is suggested that the maximum distance D between at least 50%, preferably between at least 75%, more preferably between at least 80%, still more preferably between at least 90%, yet more preferably between at least 95% and most preferably between all of the at least two layers measured in the plane perpendicular to the longitudinal direction is 4 to 15 times, preferably 5 to 13 times and most preferably 8 to 12 times larger than the average width b of the separating elements.

Good results are in particular obtained if the maximum distance D between at least 50%, preferably between at least 75%, more preferably between at least 80%, still more preferably between at least 90%, yet more preferably between at least 95% and most preferably between all of the at least two layers measured in the plane perpendicular to the longitudinal direction is 8 to 80 mm, preferably 12 to 51 mm and most preferably 16 to 30 mm.

In accordance with an embodiment of the present disclosure, for at least one of the at least two layers, the ratio of the total area of the openings in the layer divided by the sheet area of the layer, i.e. the void fraction of the layer, is between 20% and 38%. The sheet area $A_S$ of a layer is according to the present disclosure the sum of the physical area of all of the separating elements measured only on one side and the total area of the openings enclosed by the separating elements. The total area of the openings is just the sum of the (cross-sectional) areas A of the openings. Furthermore, the sheet area $A_S$ of a structured packing element is the sum of the sheet areas of the layers included in the structured packing element. As set out above, the void fraction of the packing layer is the ratio of the total area of the openings in this layer divided by the sheet area of this layer.

Preferably, for at least 50%, more preferably for at least 75%, still more preferably for at least 80%, still more preferably for at least 90%, yet more preferably for at least 95% and most preferably for all of the at least two layers the void fraction of the layer is between 20% and 38%. This allows one to obtain the advantages of the present disclosure to a particularly high extent.

Furthermore, it is preferred that for at least 50%, more preferably for at least 75%, still more preferably for at least 80%, still more preferably for at least 90%, yet more preferably for at least 95% and most preferably for all of the at least two layers the void fraction of the layer is between 25% and 35% and most preferably between 28% and 32%. This leads to a particularly excellent wetting of the layers of the structured packing element in accordance with the present disclosure.

Particularly good results are obtained, if the grid of the structured packing element is uniform, i.e. when all or at least most of the openings and separating elements are identical or at least highly similar to each other. In view of this, it is preferred that at least 50%, more preferably at least 75%, yet more preferably at least 80%, still more preferably at least 90%, yet more preferably at least 95% and most preferably all of the openings of each of the at least two layers have a hydraulic diameter d, which is between 50 and 150%, preferably between 70 and 130/o, more preferably between 80 and 120% and most preferably between 90 and 110% of the average hydraulic diameter d of all openings.

It is preferred that the hydraulic diameter d of at least 50%, preferably of at least 75%, more preferably of at least 80%, still more preferably of at least 90%, yet more preferably of at least 95% and most preferably of all of the openings of each of the at least two layers is 1.25 to 5.0 mm. Even more preferably the hydraulic diameter d of at least 50%, preferably of at least 75%, more preferably of at least 80%, still more preferably of at least 90%, yet more preferably of at least 95% and most preferably of all of the openings of each of the at least two layers is 2.0 to 4.0 mm most preferably 2.2 to 3.5 mm.

The present disclosure is not particularly limited concerning the geometry of the openings. Thus, the openings may have a circular, an ellipsoid, a squarish, a rectangular, a rhombic, a quadrilateral, a hexagonal, a trapezoidal, a polygonal or an irregular cross-sectional form.

Good results are for instance obtained, when at least 50%, preferably at least 75%, more preferably at least 80%, still more preferably at least 90%, yet more preferably at least 95% and most preferably all of the openings have a squarish or rhombic cross-section, wherein the side lengths $a_1$ are 1.0 to 5.0 mm, preferably 1.3 to 4.0 mm and most preferably 1.6 to 3.5 mm. It is particularly preferred in this embodiment that the characteristic lengths (or diagonals, respectively) of the squares or rhombuses $e_2/e_1$ is on average 0.4 to 0.7, more preferably 0.45 to 0.60 and most preferably 0.49 to 0.55. Furthermore, it is particularly preferred in this embodiment that the average width b of the separating elements between adjacent openings is 1.5 to 4.0 mm, preferably 1.6 to 3.5 mm and most preferably 1.8 to 3.0 mm.

In accordance with an alternative embodiment of the present disclosure, at least 50%, preferably at least 75%, more preferably at least 80%, still more preferably at least 90%, yet more preferably at least 95% and most preferably all of the openings have a rectangular or quadrilateral cross-section, wherein the shorter characteristic lengths $e_2$ (i.e. the short diagonals) of the rectangles or quadrangles are 1.0 to 4.0 mm and preferably 2.0 to 3.0 mm, wherein the longer characteristic lengths $e_1$ (i.e. the long diagonals) of the rectangles or quadrangles are 2.0 to 8.0 mm, preferably 2.5 to 7.0 mm and most preferably 3.0 to 6.0 mm and wherein the average width b of the separating elements between adjacent rectangles is 1.5 to 4.0 mm, preferably 1.6 to 3.5 mm and most preferably 1.8 to 3.0 mm.

The present disclosure is not particularly limited concerning the material of the layers of the structured packing element. For instance, the layers or grids, respectively, may be made of metal, such as stainless steel or a compound selected from the group consisting of aluminum, copper, titanium, zirconium and alloys. In order to save material as well as to cost-efficiently produce the grids of the layers of the structured packing element of the present disclosure, it is suggested that the grids of the at least two layers are made of expanded sheet metal, such as stainless steel or any other metallic material of construction, wherein the layer material thickness s of each grid is s=0.05 to 0.50 mm, preferably s=0.08 to 0.20 mm and most preferably s=0.09 to 0.15.

When producing a grid by expanding a sheet, the resulting sheet metal or grid is not flat anymore. This is the result of deformation, distortion, bending or vaulting of individual separating elements and a relative deformation of separating elements compared to others, e.g. by tilting. Other features like burrs may have resulted from a punching process and therefore contribute to the thickness. The resulting dimension of the expanded sheet is called grid thickness g and may be identical to the layer material thickness (which is the case, if the expanded sheet is flat, because it has been flattened by rolling) or up to several times larger than the layer material thickness. The grid thickness is typically in the order of magnitude of the width b of the separating element and should not be much larger than the width b. Hence, if the grid thickness g is larger than the layer material thickness s the ratio of the grid thickness g to average width b of the separation elements ranges from more than 0 up to approximately 1.2, more preferably from 0.4 to 1 and most preferably from 0.5 to 0.8. The grid thickness g is significantly smaller than the maximum distance D between two adjacent layers measured in the plane perpendicular of the longitudinal direction. Preferably, the ratio of the maximum distance D to the grid thickness g (i.e. D/g) is at least 3.

Good results are in particular obtained, when the maximum distance D between each adjacent of the at least two layers measured in the plane being perpendicular of the longitudinal direction is at most 15 times larger than the average hydraulic diameter d of the openings.

As set out above, an open space is provided between the layers extending from one end to the opposite end of the layers in order to assure a good gas flow in the structured packing element of the present disclosure. It is preferred that the open space between the at least two layers of the structured packing element is defined by periodic deformations. In view of this, it is suggested that at least 50%, preferably at least 75%, more preferably at least 80%, still more preferably at least 90%, yet more preferably at least 95% and most preferably all of the at least two layers comprise periodic deformations, wherein the open space between the at least two layers is defined by the periodic deformations. It is particularly preferred that all layers of the structured packing element of the present disclosure comprise such periodic deformations, i.e. that the structured packing element of the present disclosure does not include any flat layers.

For instance, the periodic deformations may be corrugations comprising a plurality of alternately oriented peaks and valleys, wherein the peaks of a layer contact the valleys of an adjacent layer and the valleys of a layer contact the peaks of an adjacent layer, wherein adjacent layers are oriented such that the peaks and valleys of the adjacent layers intersect in crisscross fashion with the peaks and valleys of the layers extending obliquely relative to the longitudinal direction. Of course, it is also possible that not all peaks of a layer contact one or more valleys of an adjacent layer, but that rather a part of the peaks of a layer contact one or more valleys of an adjacent layer and vice versa. However, between two adjacent layers at least three touching points should be present. Preferably at 30 to 90% and more preferably at 50 to 80% of the locations, where peaks and valleys of adjacent layers are opposite of each other, no touching contact is present, wherein at the remaining locations the respective peaks and valleys of adjacent layers touch each other.

Good results are in particular obtained in this embodiment, when the angle α between each of the peaks and each of the valleys with respect to the longitudinal direction is 10° to 60°, preferably 20° to 50° and most preferably 25° to 47°, wherein the peaks and valleys of adjacent layers are preferably oriented in opposing directions. This allows a uniform distribution of the light phase over at least one direction of the cross-section the structured packing element. The angles should not be too large to minimize pressure drop and maximize capacity.

In order to reduce the pressure loss of the structured packing element, it is proposed in an embodiment of the present disclosure that the peaks and valleys are bent in the terminal portions of the layers in relation to the peaks and valleys of the central portion being arranged between the terminal portions so that the flow resistance in the terminal zones of the structured packing element is reduced with respect to that of the zone arranged between the terminal zones. Accordingly, the peaks and valleys of the layers of this embodiment do not extend linearly. Preferably, the peaks and valleys are bent in the terminal portions of the layers so as to extend at least essentially vertically. Essentially vertical means that the peaks and valleys are not inclined at the lower and upper edges of the layers more than 10°; preferably not more than 5° and more preferably not more than 2° to the vertical direction. The terminal zones are the uppermost and the lowermost zones of the layers extending from the upper and lower edges of the layers 30%, preferably 25% and more preferably 20% or less along the sheet length, which is the direction along the longitudinal direction of the layer. Each of the terminal zones may have peaks and valleys with a different height than those of the central zone, which is the zone of the layer between the two terminal zones. Instead of providing such bends or different heights in both terminal zones, they may only be present in one of the terminal zones.

In accordance with one embodiment of the present disclosure, the periodic deformations are waves having a square, a triangular, a sinusoidal or a meander-type cross-section comprising peaks and valleys, wherein the peaks of a layer contact the valleys of an adjacent layer, and the valleys of a layer contact the peaks of another adjacent layer, wherein adjacent layers are oriented such that the peaks and valleys of the adjacent layers intersect in crisscross fashion with the peaks and valleys of the layers extending obliquely relative to the longitudinal direction.

Good results are in particular obtained in this embodiment, when the angle α between each of the peaks and each of valleys with respect to the longitudinal direction is 10° to 60°, preferably 20° to 50° and most preferably 25° to 47°, wherein the peaks and valleys of adjacent layers are preferably oriented in opposing directions. This allows a uniform distribution of the light phase over at least one direction of the cross-section of the structured packing element.

According to still a further embodiment of the present disclosure, the periodic deformations may have a structure as disclosed in U.S. Pat. No. 5,885,694, where two adjacent sheets touch each other on peaks and valleys of upward and downward curved stripes. Each sheet comprises a linearly arranged sequence of upward and downward curved stripes, wherein the lines of two adjacent sheets cross with an angle.

In accordance with an embodiment of the present disclosure, the periodic deformations are dimples, wherein each of the dimples comprises a dimple valley wall, wherein at least a part of the dimple valley walls of a layer contact the non-dimpled surface part of an adjacent layer. The dimples may have the form of a crater, i.e. a form like dimples of a golf ball. However, it is preferred that the dimples are elongated dimples, such as grooves, with an annular cross-section.

However, it is also possible that the open space is not defined by deformations of the layers of the structured packing element itself, but for example by means of one or more spacers, which are provided between adjacent layers, wherein the open space between the at least two layers is defined by the one or more spacers.

The present disclosure is not particularly limited concerning the number of layers contained therein. The number of layers in a packing element depends on the diameter of the mass transfer column and the required specific area $a_M$ for the mass transfer. The more surface is required, i.e. the higher the specific area, the more layers will be present, and the maximum distance D will be smaller, accordingly. Although the structured packing element is generally of round cross-section, there may also be cross-sections of other shapes, e.g. rectangular ones, depending on the shape of the heat and/or mass transfer column. If the column has a large diameter, the element is commonly subdivided into segments or tiles to reduce weight and to allow piece-wise installation.

Particularly good combinations of mass transfer efficiency and capacity are obtained, when the structured packing element according to the present disclosure has a specific area $a_M$ of 60 to 750 $m^2/m^3$, 120 to 500 $m^2/m^3$ and most preferably 200 to 450 $m^2/m^3$.

The specific area $a_M$ is defined as the geometrical area $A_M$ of the structured packing element divided by the volume $V_M$ that the structured packing element occupies. The geometrical area $A_M$ of the structured packing element is the sum of the geometrical area of all layers comprised in the element, wherein the geometrical area of a layer adds up both sides of the layer as if there were no openings or holes. In other words, the geometrical area is approximately obtained by multiplying the sheet area $A_S$ of the packing layers by two because both sides of the layers account for the geometrical area.

The sheet area $A_S$ of a structured packing layer is obtained by adding both the area of the openings in the layer and the physical area $A_P$ of the layer. $A_P$ counts only surface that is physically present. Holes do not contribute to the value. The sheet area $A_S$ of the structured packing element is obtained by summing the sheet area of all layers comprised therein.

The physical area $A_P$ of a structured packing layer is the sum of the surface measured on one selected side of all separating elements included in the structured packing layer. The edges of the layer material thickness s do not contribute to this area. The physical area $A_P$ of the packing is the sum of the physical area of all layers comprised therein.

Apart from the definitions $a_M$, $A_M$, $A_S$ and $A_P$ for areas, the expressions "surface" and "surface area" are used in a more qualitative or intuitive manner in the description of the present disclosure.

Preferably, the structured packing element has a height of 100 to 300 mm and preferably of 150 to 250 mm.

In accordance with an embodiment, the present disclosure relates to a mass transfer column comprising at least one structured packing element as described above.

Preferably, the mass transfer column comprises 1 to 10, more preferably 2 to 8 and most preferably 2 to 4 beds, wherein each bed comprises at least one structured packing element as described above. Preferably, one bed comprises 2 to 20, more preferably 4 to 15 and most preferably 6 to 10 structured packing elements. In order to achieve a very good gas distribution in the bed, two adjacent structured packing elements are rotated along the axis of the column that is generally parallel to the longitudinal direction. The angle of rotation is around 50 to 120°, more preferably 70° to 110° and most preferably 800 to 100°.

In addition, it is preferred that the mass transfer column comprises a distributor above each of the beds of structured packing elements so as to allow to at least essentially homogenously distribute the heavy phase during the operation of the mass transfer column over the cross-section of the structured packing element bed.

In accordance with one embodiment of the present disclosure, it is proposed that the mass transfer column comprises below the bottom of each bed of structured packing element a collector, which allows to collect the heavy phase trickling down the surfaces of the layers of the structured packing elements during the operation of the mass transfer column.

BRIEF DESCRIPTION OF THE FIGURES

The invention will be explained in more detail hereinafter with reference to the drawings.

FIG. 2C shows two layers of the structured packing element shown in FIG. 2A.

FIG. 1 shows is a schematic side view of a mass transfer column 10 and more specifically a distillation column 10 according to one embodiment of the present disclosure (the transparent inside of the figure is only for illustrative purposes). Also for illustrative purposes, the grid structure of the layers in not shown in FIG. 1, but only in FIG. 6. The distillation column 10 comprises a plurality of structured packing elements 12, which are arranged in form of two beds 14, 14'. Above each of the two beds 14, 14' a distributor 16, 16' is arranged to evenly distribute the liquid over the cross-section of the bed, while leaving enough space for the vapor to ascend through it. Below each bed 14, 14' a grid-like holding device 18 and a collector 20 are arranged, wherein the grid-like holding device 18 keeps the bed 14 at its position and the collector 20 collects the liquid trickling down from the bed 14, while sufficient open space is left in the collector for the vapor to ascend.

Figure 1:
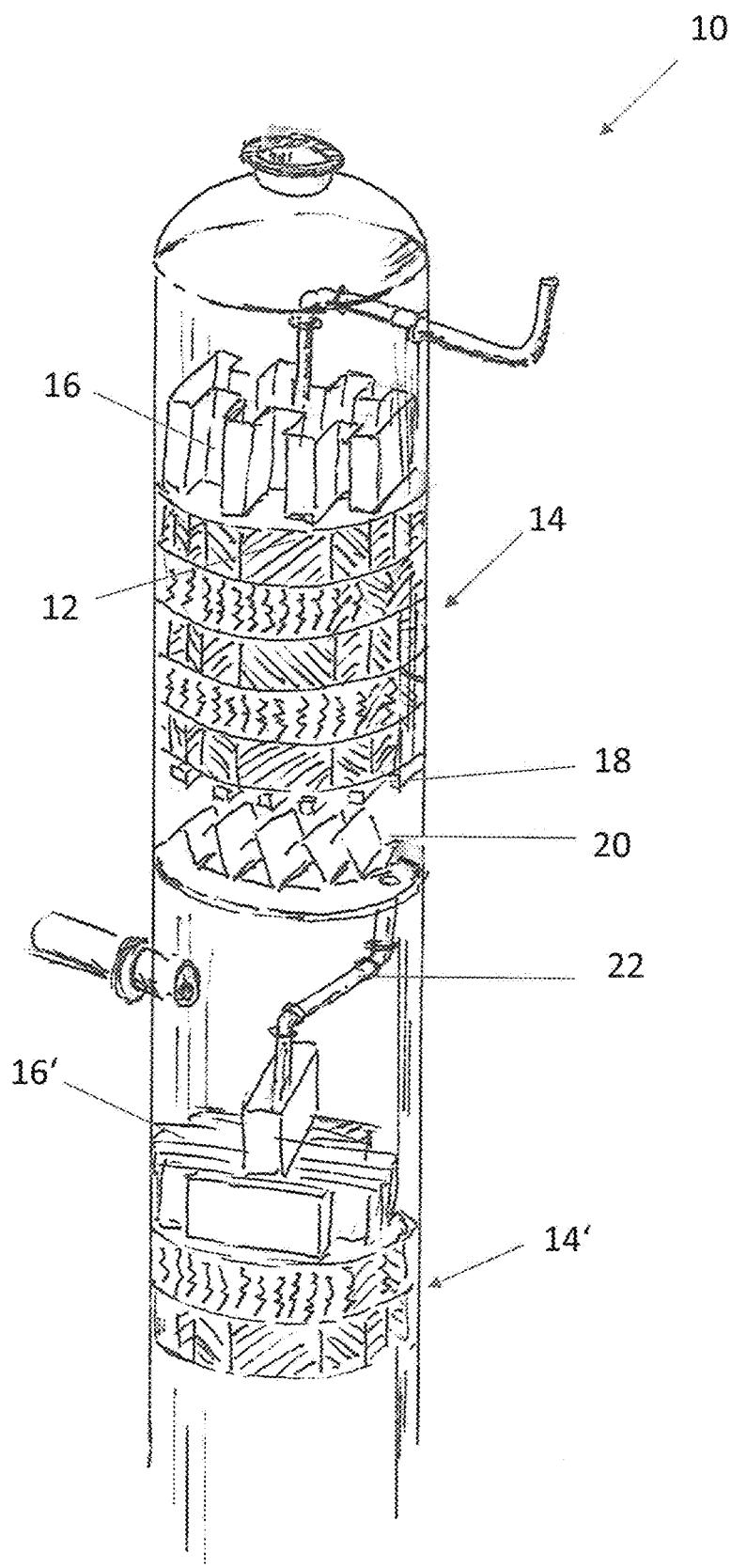
FIG. 1 is a schematic side view of a mass transfer column including several structured packing elements according to one embodiment of the present disclosure.

During the operation of the distillation column 10, gas ascends as light phase from the bottom to top, whereas liquid as heavy phase descends in counter-current from the top to the bottom of the distillation column 10. More specifically, the liquid is essentially homogenously distributed by the distributor 16 over the cross-section of the bed 14 and trickles down along the surfaces of the layers of the structured packing elements 12. Between the different layers of the structured packing elements 12 open spaces are provided, which are filled with the gas and provide a path for the gas to ascend, while it is driven by a pressure gradient. By allowing the liquid to spread on the surface of the layers of the structured packing elements 12, a large interface is created between the two phases so that an efficient heat and mass transfer between the liquid and the gas is established at the interface. At the bottom of the bed 14, the liquid is collected in the collector 20 and guided via the pipe 22 down to the distributor 16' above the second bed 14'.

Figure 2A:
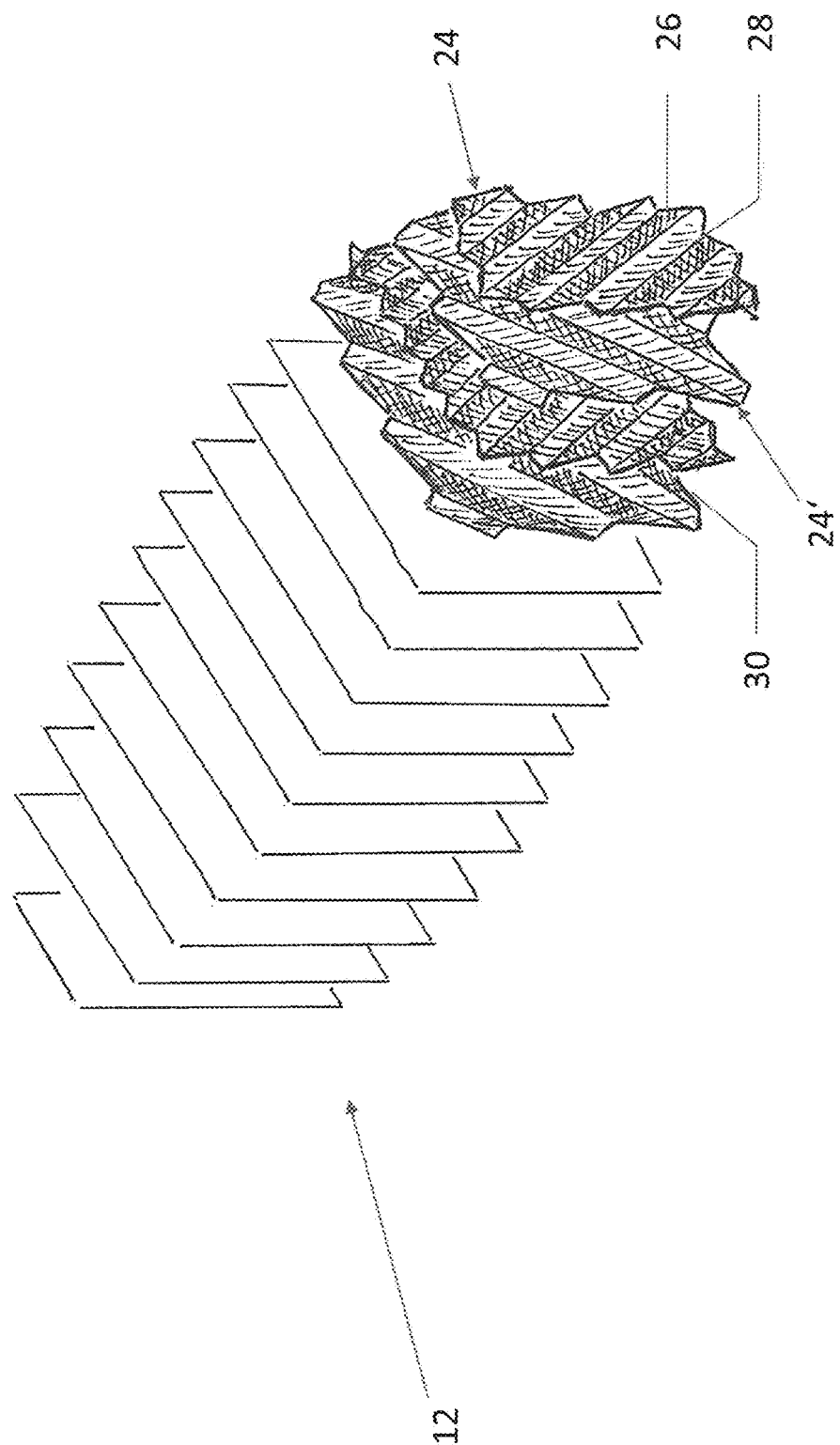
FIG. 2A is an explosion view of a part of the sheets of a structured packing element according to one embodiment of the present disclosure.
Figure 2B:
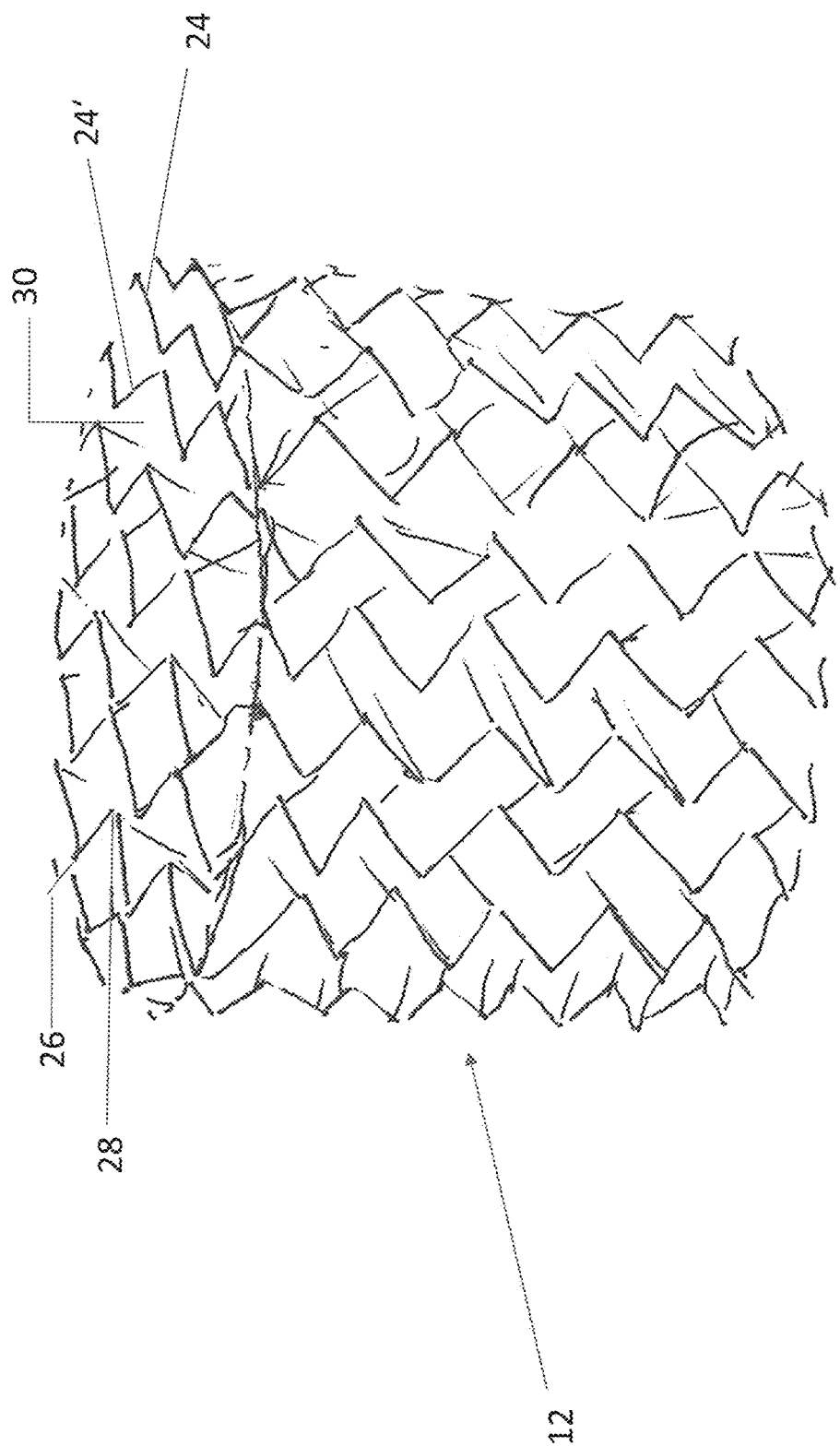
FIG. 2B is a schematic side view of the structured packing element shown in FIG. 2A.

FIGS. 2A to 2C show a structured packing element 12 of the so-called cross-channel corrugated sheet packing type. For illustrative purposes, the grid structure of the layers in not shown in FIGS. 2A-2C, but only in FIGS. 6A-6F. The structured packing element 12 is assembled from a plurality of corrugated sheets 24, 24', which are parallel and in touching contact with each other. Each of the corrugated sheets 24, 24' is a grid as described above and as described in further detail below according to FIGS. 6A-6F. At the bottom right of FIG. 2C the grid-structure of a part of the corrugated sheet 24 is schematically indicated. As it is understood from the above specification, indeed at least two and preferably all of the corrugated sheets 24, 24' consist of such grids, which is not shown in FIGS. 2A to 2C only for illustrative reasons. In the present embodiment, the corrugated sheets 24, 24' are made of expanded sheet material, i.e. they are prepared by cutting and stretching a thin metal plate and then deforming the expanded sheet metal to corrugated sheets 24, 24'.

The corrugated metal sheets 24, 24' are fixed to each other by means of several rods (not shown) penetrating the corrugated sheets 24, 24' perpendicular to the longitudinal section of the corrugated sheets 24, 24', wherein the rods are fixed with the first and last corrugated sheet by means of a washer and a nut or by bending the rods or by any other means (not shown). Each corrugated sheet 24, 24' comprises a plurality of alternately oriented peaks 26 and valleys 28, wherein adjacent corrugated sheets 24, 24' are oriented such that the corrugations 26, 28 of the adjacent corrugated sheets 24, 24' intersect in crisscross fashion with the corrugations 26, 28 of the corrugated sheets 24, 24' extending obliquely relative to the longitudinal direction, thus forming inclined channels 30 which continuously cross one another. More specifically, angle α between each of the peaks 26 and each of the valleys 28 with respect to the longitudinal direction V is 10° to 60°, preferably 20° to 50° and most preferably 25° to 47°, wherein the peaks 26 and valleys 28 of adjacent layers 32, 32' or 24, 24', respectively, are oriented in opposing directions. The channels 30 define a maximum distance D between adjacent corrugated sheets 24, 24', such as for example of 20 mm. These channels 30 positively influence the flows of the gas phase and of the liquid phase within the structured packing element 12 and facilitate the mass transfer between the phases. That is, the gas phase and liquid phase are brought into contact in the channels 30 of the structured packing element 12 and the mass transfer as well as the heat transfer between the phases is thus facilitated. More specifically, ascending gas comes into contact with liquid, which is present on the surface of the corrugated sheets 24, 24' defining the channels 30, when it flows downwardly through the mass transfer column. All in all, the light phase flows through the open space or channels 30, respectively, without a bypass flow through the openings 40 of the grid 38 of the layers 32, 32' of the structured packing element 12. This leads to a particular efficient mass and energy transfer between the light and heavy phases. Moreover, the crisscross fashion of the channels 30 leads to an optimal distribution of the phases from left to right.

Figure 3:
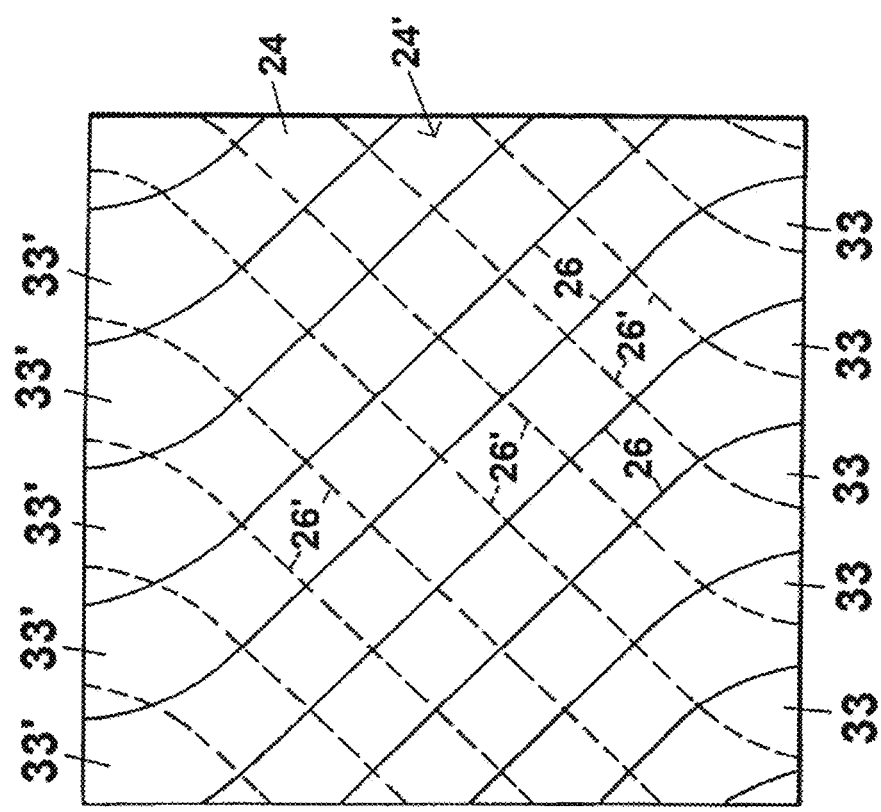
FIG. 3 is a fragmentary view of a structured packing element according to another embodiment of the present disclosure.

FIG. 3 shows a fragmentary view of a structured packing element in accordance with an embodiment. The structured packing element of FIG. 3 is similar to that shown in FIGS. 2A to 2C except that corrugated sheets 24, 24' do not comprise linear extending peaks and valleys, but that the peaks 26, 26' and valleys of the corrugated sheets 24, 24' are bended in the terminal zones or portions 33, 33', respectively, so as to extend in the terminal portions 33, 33' of the corrugated sheets 24, 24' essentially in the vertical direction. The terminal zones are the uppermost and the lowermost zones 33, 33' of the corrugated sheets 24, 24' extending from the upper and lower edges of the corrugated sheets 24, 24' 30%, preferably 25% and more preferably 20% or less along the length of the corrugated sheets 24, 24', which is the direction along the longitudinal direction of the corrugated sheets 24, 24'. Each of the terminal zones 33, 33' may have peaks 26, 26' and valleys with a different height than those of the central zone, which is the zone of the layer between the two terminal zones 33, 33'. Such features as the different height or the bend may be present in both terminal zones 33, 33' of the corrugated sheets 24, 24' only.

In FIG. 3, the solid lines depict the peaks 26 of the corrugations in the face of the corrugated sheet 24 presented to the viewer, while the broken lines 26' depict the peaks of the corrugations in the corresponding face of the corrugated sheet 24' immediately behind the one in view. By bending the terminal portions 33, 33' so as to extend in the terminal portions 33, 33' of the corrugated sheets 24, 24' essentially in the vertical direction, the flow resistance of the terminal portions 33, 33' of the corrugated sheets 24, 24' is reduced compared to the flow resistance of the portions being located between the terminal portions 33, 33' of the corrugated sheets 24, 24'. This leads to a reduced pressure loss of the structured packing element.

Figure 4:
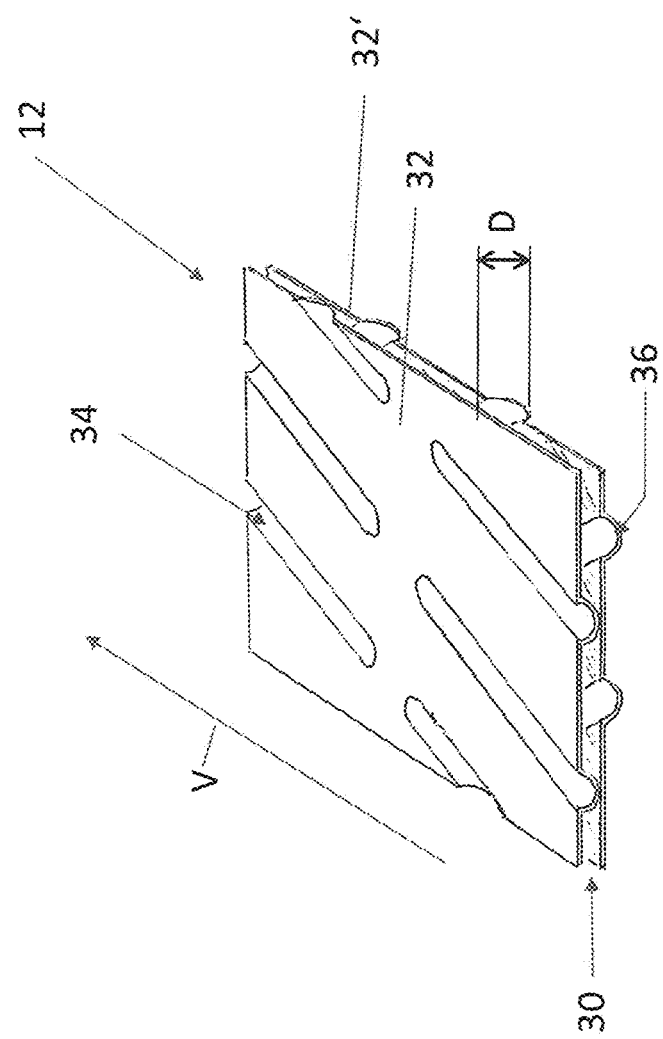
FIG. 4 is a schematic view of a part of a structured packing element according to one embodiment of the present disclosure.

FIG. 4 shows two layers of a structured packing element 12 in accordance with an embodiment. For illustrative purposes, the grid structure of the layers in not shown in FIG. 4, but only in FIGS. 6A-6F. The structured packing element 12 comprises several layers 32, 32', wherein each layer is deformed to provide several dimples 34, wherein each of the dimples 34 comprises a dimple valley wall 36. Adjacent layers 32, 32' are arranged parallel to each other in touching contact with each other. In other words, adjacent layers 32, 32' touch each other so that at least some of the dimple valley walls 36 of a layer 32 contact the non-dimpled surface part of an adjacent layer 32'. Thus, the dimples 34 in fact act as spacer so as to define a channel 30 or open space, respectively, between the layers 32, 32' defining a maximum distance D between the single layers 32, 32' so as to allow the light phase or gas, respectively, to ascend though the channel 30.

Figure 5:
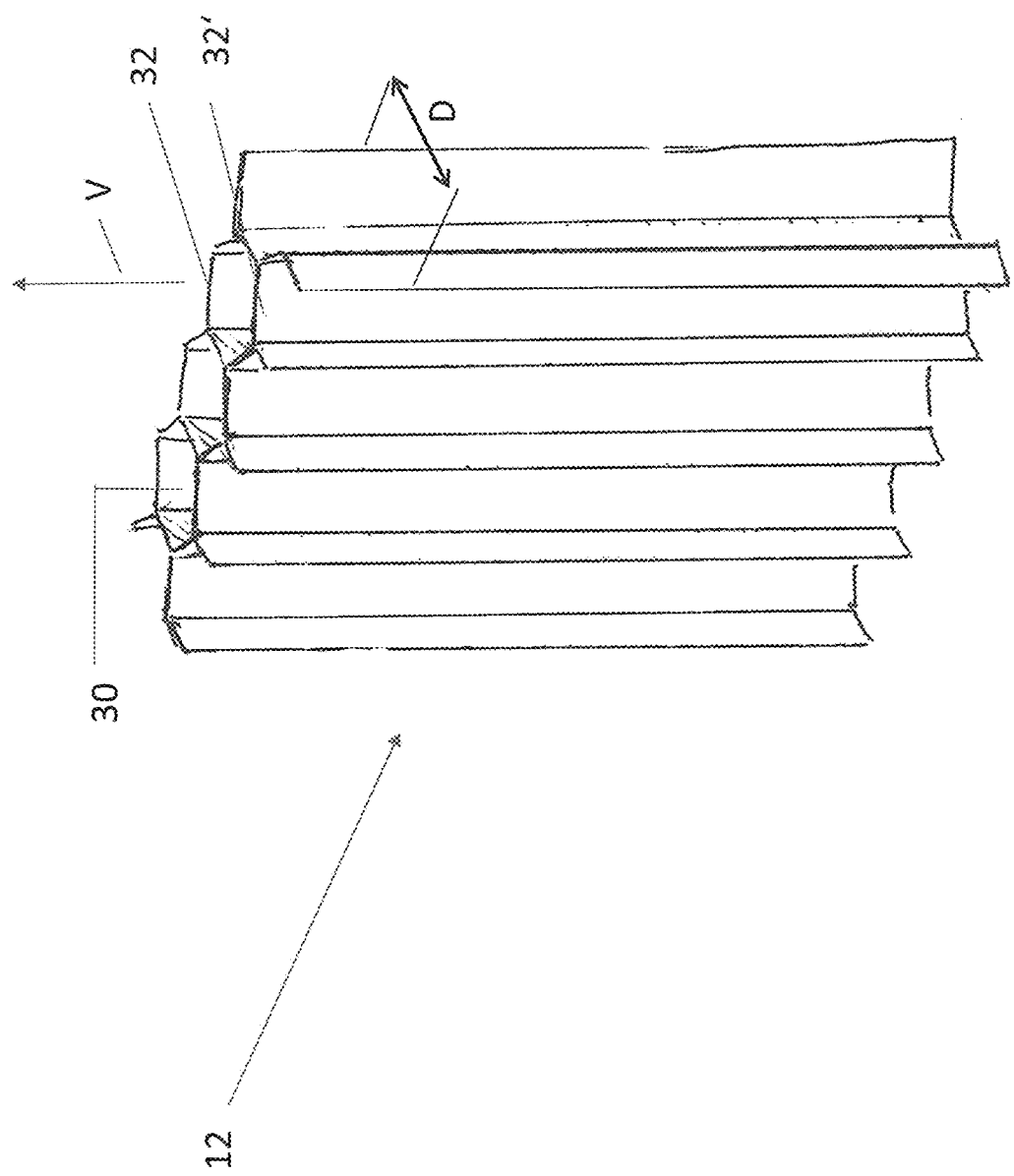
FIG. 5 is a schematic view of a part of a structured packing element according to an embodiment of the present disclosure.

FIG. 5 shows a structured packing element 12 in accordance with one embodiment. For illustrative purposes, the grid structure of the layers in not shown in FIG. 5, but only in FIGS. 6A-6F. The structured packing element 12 comprises several layers 32, 32', wherein each layer is deformed so that two adjacent layers 32, 32' touching each other define a channel 30 or open space, respectively, with a hexagonal cross-section between the layers 32, 32' defining a maximum distance D between the single layers 32, 32' so as to allow the light phase or gas, respectively, to ascend though the channel 30. The layers 32, 32' could be arranged in inclined orientation with alternating angle relative to the longitudinal direction such that the channels 30 of the layers 32, 32' cross each other. Despite a preferred gas flow following those channels 30 alternatively in the right or left direction, the average gas flow would follow the longitudinal direction V.

FIGS. 6A to 6F are schematic views of different embodiments of the grid 38 that forms the layers 32 of the structured packing element 12 according the present disclosure, which are for instance suitable to be used in a structured packing element as shown in any of FIGS. 2A to 2C, 3, 4 and 5. The grid 38 of the layer 32 of the structured packing element shown in FIG. 6A comprises openings 40 with a quadrilateral cross-section, wherein the openings 40 are surrounded and separated from each other by separating elements 42. The separating elements 42 are thin strips with an average width b of, for example, 2 mm, wherein the separating elements 42 completely surround the openings 40. The two side lengths $a_1$, $a_2$ of the openings 40 are selected so as to result in an opening 40 with a suitable hydraulic diameter d of, for instance, 3 mm. As known in the field, the hydraulic diameter d may be calculated in accordance with the formula 4 A/P, wherein A is the cross-sectional area of the opening 40 and P is the perimeter of the opening 40.

In accordance with the present disclosure, the average width b of the separating elements 42 between adjacent openings 40 is between 70% and 125% of the average hydraulic diameter d of the adjacent openings 40, 40'. Moreover, the maximum distance D between at least two adjacent of the at least two layers 32,32' measured in the plane being perpendicular of the longitudinal direction V is at least 4 times larger than the average width b of the separating elements 42. By adjusting these relations, the wetting of the surface of the layers 32, 32' of the structured packing element 12 can be further improved and—as a consequence thereof—the mass transfer efficiency based on a given capacity of the structured packing element 12 is increased despite the fact that less physical area and less material are present.

The grid 38 may be simply produced of expanded sheet material, i.e. by cutting and stretching a thin metal plate and then deforming the expanded sheet metal to the desired form, such as to a corrugated sheet.

Figure 6:
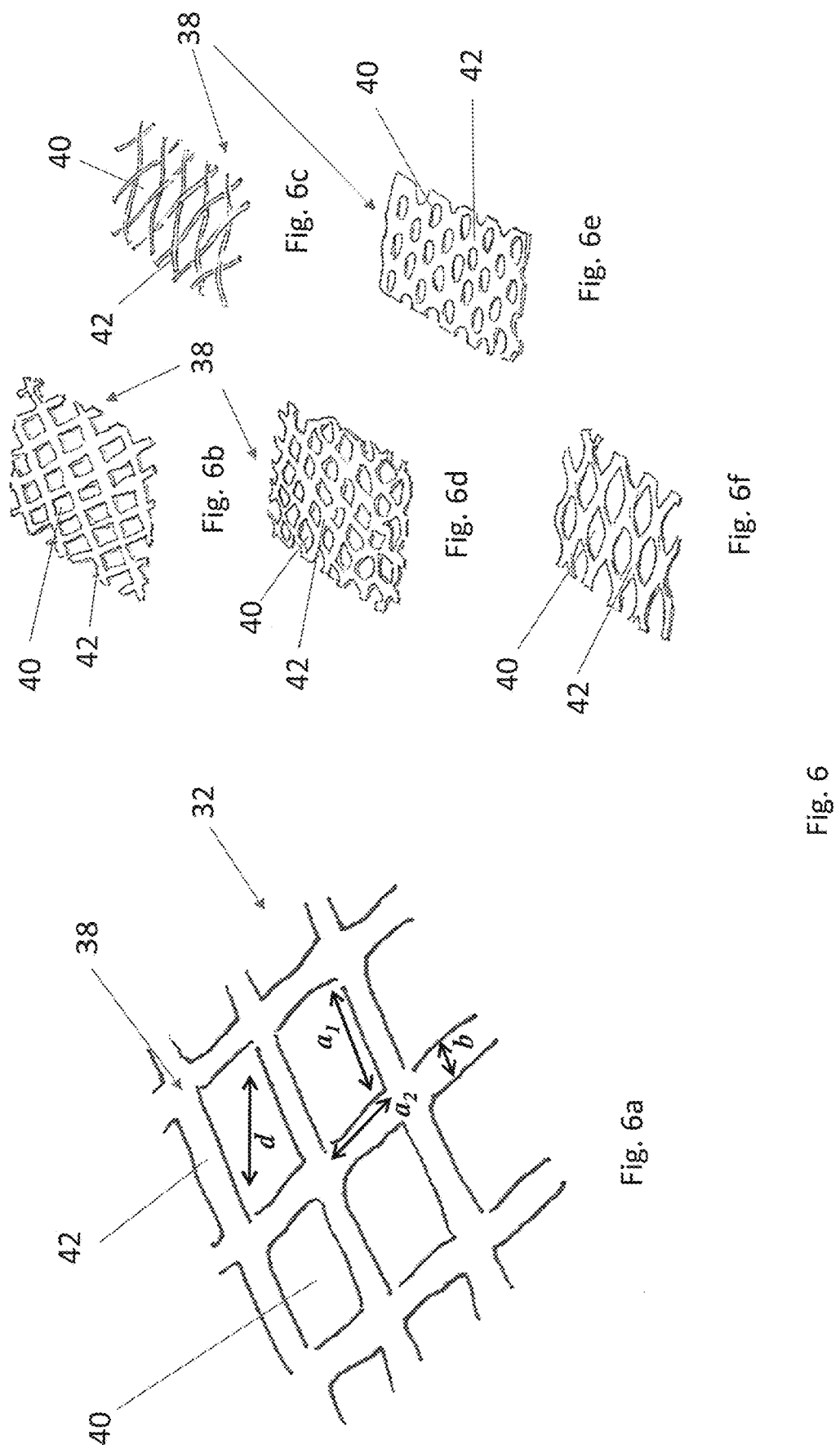
FIGS. 6A-6F are schematic views of different embodiments of the grid structure of the layers of the structured packing element of the present disclosure.

Grids 38 with a different geometry of the openings 40 and a different geometry of the separating elements 42 are shown in FIGS. 6B to 6F. The openings 40 of the grids 38 of FIGS. 6B and 6C are quadrilateral, whereas the openings 40 of the grid 38 of FIG. 6D are irregular and the openings 40 of the grids 38 of FIGS. 6E and 6F are ellipsoid. They may also be of lenticular shape.

Figure 7:
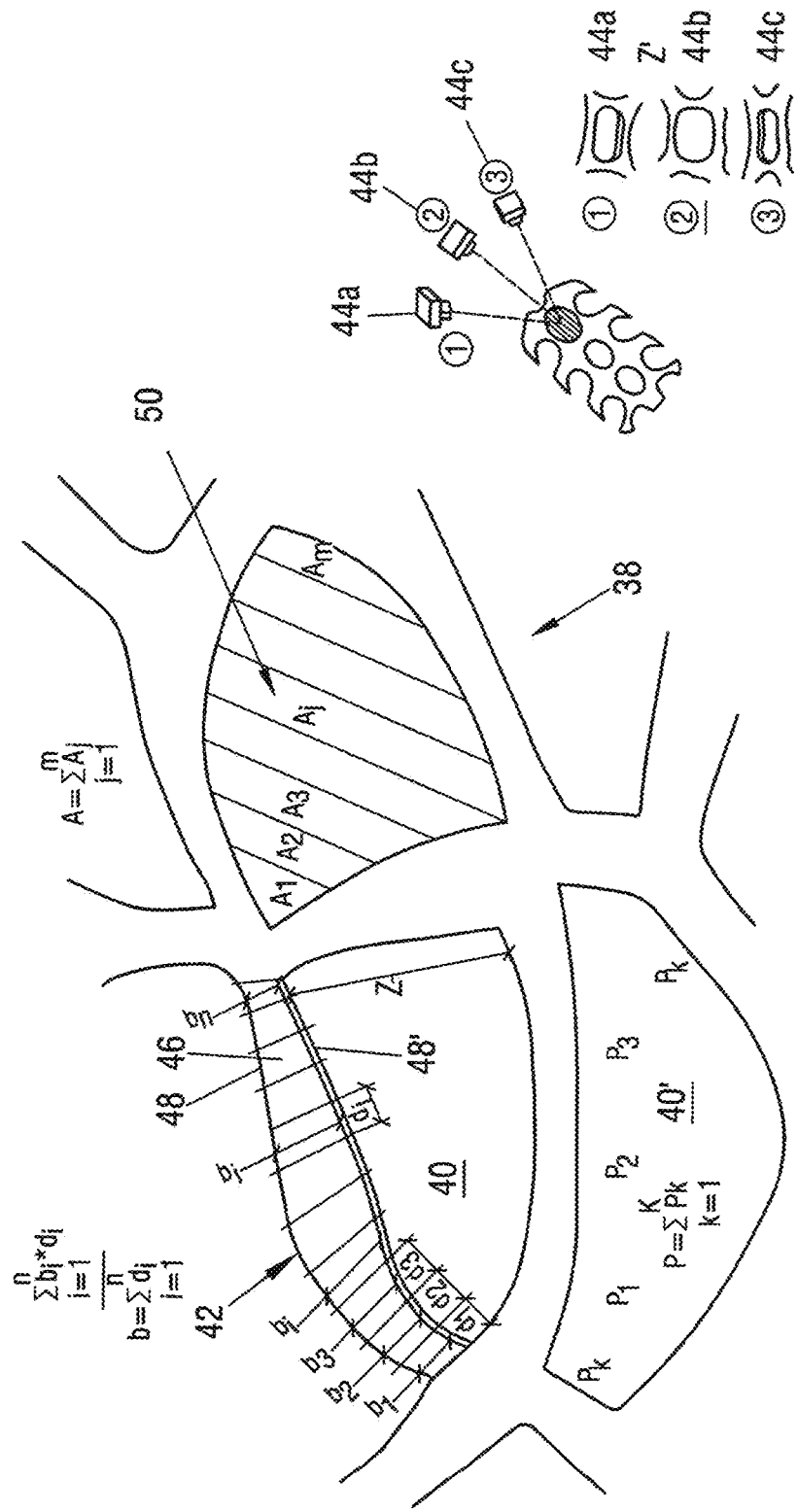
FIGS. 7A and 7B are schematic views illustrating the determination of the average width of a separating element and of the average hydraulic diameter of an opening.

Subsequently, the determination of the width b of a separating element 42 and of the hydraulic diameter d of an opening 40 of the grid 38 of a structured packing element in accordance with the present disclosure is described under reference to FIGS. 7A and 7B. First of all, several plan views of one of the openings 40, 40' of the structured packing element 12 are made by taking three photographic pictures 44a, 44b, 44c of the opening 40 under different angles. The plan views of the opening 40 photographic pictures 44a, 44b, 44c are taken along the normal axis of the plane defined by the adjacent edges 48, 48' of the separating element 42. The photographic picture 44b that renders the opening 40 largest is then taken as the plan view of the opening 40. One reference length z is used to determine lengths and sizes on the plan view. This is achieved by identifying or marking a certain distance z on the real object in the neighborhood of the opening 40 and measuring its length. The ratio between the effective length z' of this distance appearing on the plan view and the distance z measured on the real object is used for scaling all other distances that are measured on the plan view.

For determining the width b of a separating element 42, the separating element 42 of the plan view is divided up into individual sections 46 designated i=1, 2, 3 . . . n each having a section length $d_i$. For each of the sections, the shortest distance $b_i$ between the adjacent edges 48, 48' within the sections 46 is measured. The sum of the products $d_i \cdot b_i$ divided by the sum of $d_i$ multiplied with the coefficient z/z' yields the average width b of the separating element 42.

The hydraulic diameter of the opening 40 is calculated with the formula 4 A/P, wherein A is the cross-sectional area of the opening 40 and P is the perimeter of the same opening 40. The cross-sectional area of the opening 40 is subdivided in a number j=1, 2, 3 . . . m of sections 50 each having a simple shape. The area of each section 50 is designated $A_j$ and is calculated using basic measures and basic geometric formula. The area A of the opening 40 is obtained by summing up all areas $A_j$ determined in the opening 40.

The perimeter P of the opening 40' is determined by subdividing the perimeter P of the opening 40' in a number of k=1, 2, 3 . . . K individual straight lines $P_k$ that approximate the opening 40' best and represent it by a closed polygon. By summing up the lengths of these straight lines $P_k$, the perimeter P is obtained. Again, the lengths must be translated into real lengths using the ratio z/z' as defined previously.

Figure 8:
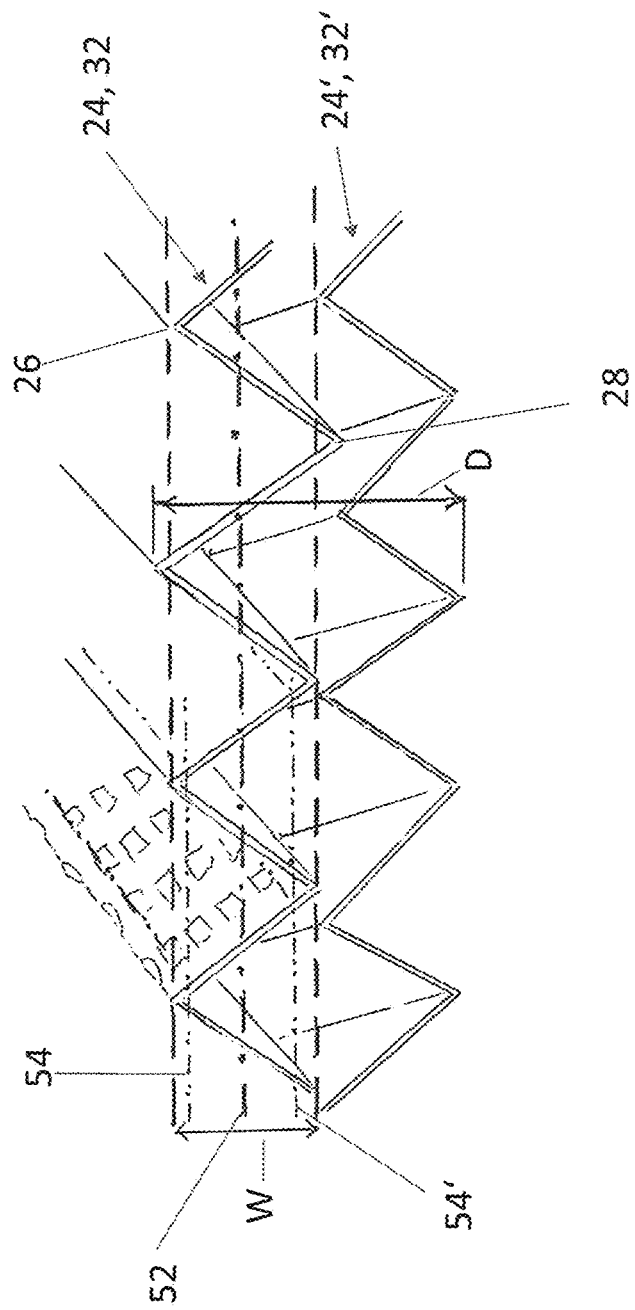
FIG. 8 illustrates the determination of the least deformed portion of a structured packing element made of corrugated layers.

FIG. 8 illustrates the determination of the least deformed portion of a structured packing element made of corrugated sheets 24, 24' as layers 32, 32'. As set out above, in preferred embodiments of the present disclosure, the layers 32, 32' of the structured packing element 12 are made of expanded sheet metal, i.e. by cutting and stretching a thin metal plate and then deforming the expanded sheet metal to, for instance, corrugated sheets 24, 24'. After this processing, the openings and separating elements are likely to be distorted and/or stretched around the peaks 26 and the valleys 28 of the corrugations of the corrugated sheets 24, 24'.

However, the inclined flanks, which are defined by the approximately straight portion of the grid connecting the peaks 26 and the valleys 28, include openings and separating elements of almost unmodified sizes, because deformation is less pronounced there. It is therefore preferred according to the present disclosure to measure the dimensions only in the portion of the layer that is less deformed, which is designated a "least deformed portion" of the corrugated sheets 24, 24'. This "least deformed portion" is defined as follows. The corrugated sheet has an average layer width W. This average layer width is determined by the amplitude of the majority of the peaks 26 and valleys 28 of the layer 24. An upper and a lower plane represented by two dashed lines in the figure below are drawn to touch the majority of the peaks 26 and the valleys 28 of the layer. The distance between these two dashed lines is called average layer width W, and it is typically around half the maximum distance D. The value W is very often a constant value, but it may vary in the most general case as the two planes do not need to be parallel and a packing element may contain layers of different width. A third center plane 52 is defined, which is placed in such a way, that from each point on this center plane 52, the distance measured to the upper and the lower plane is identical. The least deformed portion of the corrugated layer 24, which shall be considered when determining the characteristic dimensions of the grid, is bordered by an upper and a lower limiting plane 54, 54', which is positioned at ±20%, more preferably ±30% and most preferably ±40% of W around the center plane 52. The openings and separating elements in this least deformed portion, i.e. the openings and separating elements found between these two limiting planes 54, 54', are analyzed when determining the parameters, such as average hydraulic diameter of the holes and average widths of the separating elements. According to one embodiment of the present patent application for at least 90% of the holes between the limiting planes the following is valid: Each opening with its surrounding system of separating elements shall have the same appearance and identical hydraulic diameter d. The surrounding separating elements shall on average have the same width b. A structured packing element layer that fulfills this statement is considered a layer made of a uniform grid.

The above observations are also valid for layers of any different shape. It is not limited to corrugated layers.

Figure 9:
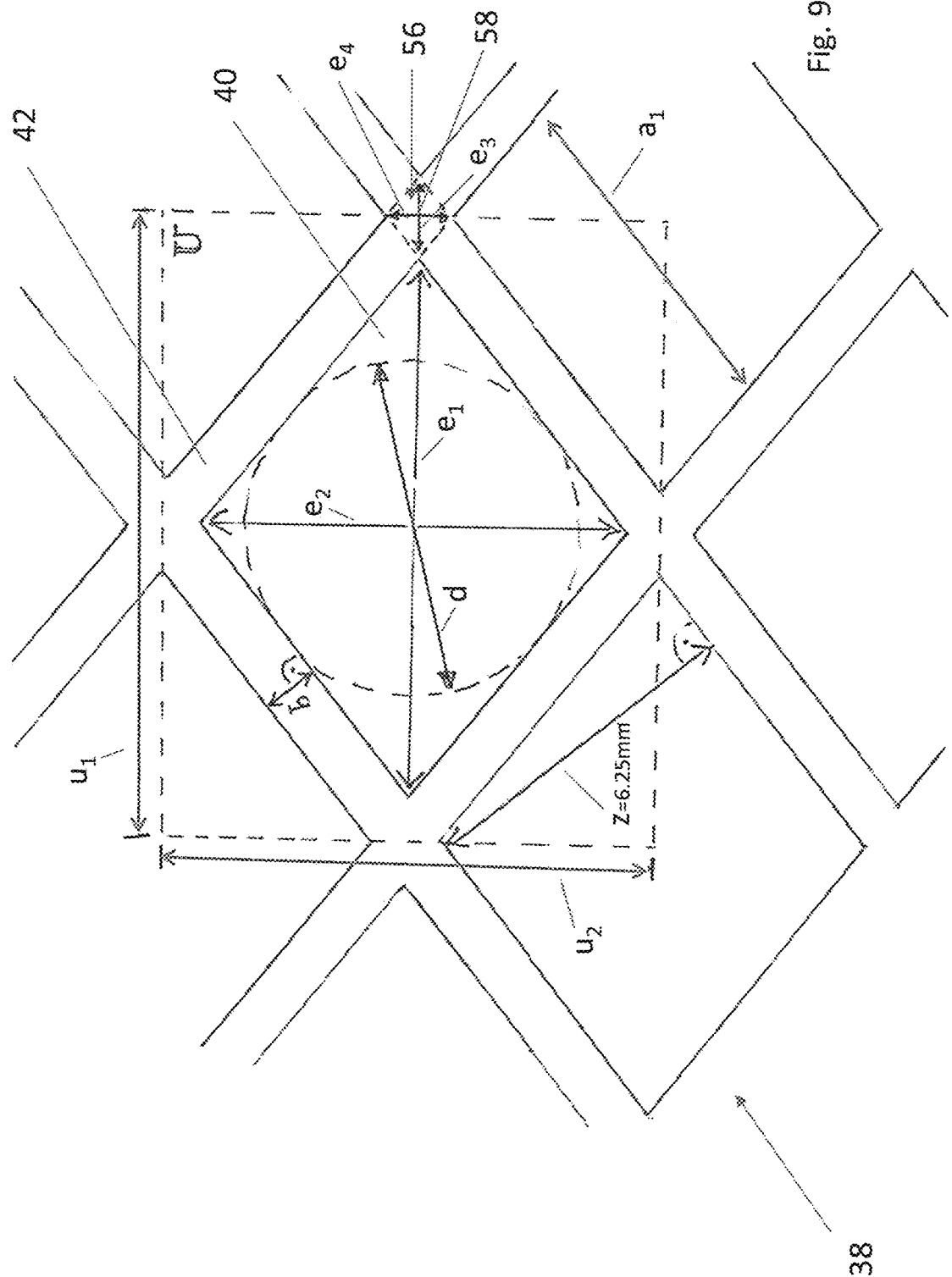
FIG. 9 is a true to scale plan view illustrating the determination of the parameters for a specific example in accordance with the present disclosure.

FIG. 9 is a true to scale plan view illustrating the determination of the parameters for a specific example in accordance with the present disclosure, namely for an opening 40 having the shape of a rhombus (i.e. an equilateral quadrilateral). The dimensions are chosen for illustrative purpose only and are not necessarily typical for the present disclosure. It should even be noted that there was no intention to make them fit into the advantageous ranges of dimensions in accordance with the present disclosure.

The reference length z has been measured to be 6.25 mm. By measuring the length z as it appears in the printed picture (plan view), one obtains z'. All other lengths that can be measured in the figure are multiplied by the coefficient z/z' obtained as described above. Accordingly, the longer characteristic length (or diagonal, respectively) $e_1$ of the rhombus is 10 mm long and the shorter characteristic length (or diagonal, respectively) $e_2$ is 8 mm. The side length $a_1$ of the rhombus is 6.4 mm, which computes as $a_1 = \frac{1}{2} \cdot \sqrt{(e_1^2 + e_2^2)}$. The separating element 42 has a width of b=1 mm. The area of the opening 40 and the length of the perimeter P length are obtained by the following equations:

$$A = e_1 \cdot e_2 / 2$$

$$P = 4 \cdot a_1 = 2 \cdot \sqrt{(e_1^2 + e_2^2)}$$

Numerical values therefore are A=40 mm² and P=25.6 mm. The resulting hydraulic diameter is $d = 4 \cdot A/P = e_1 \cdot e_2 / \sqrt{(e_1^2 + e_2^2)}$.

The hydraulic diameter of approximately d=6.25 mm is visualized in FIG. 9 by means of a circle of diameter d.

If the grid 38 of the structured packing element is very regularly composed of the rhombic openings 40 and the separating elements 42 as shown in FIG. 9, a unit cell U can be defined, which is a typical repetitive element of the grid containing all its features and dimensions. The unit cell U is a quadrilateral (rectangle) U covering an opening 40, wherein the quadrilateral U extends through midpoints 58 of the four junction points 56 of the separating elements 42. The unit cell U has a short unit cell height $u_2$ and a long unit cell width $u_1$. While the short unit cell height $u_2$ is aligned with the short diagonal $e_2$ of the opening 40, the long unit cell height $u_1$ is aligned with the long diagonal $e_1$ of the opening 40. It is possible to determine areas in the unit cell U, namely those of the entire unit cell U, those of the openings 40 and those of the separating elements 42. To determine $u_1$ and $u_2$, the lengths $e_3$ and $e_4$ of the small rhombus at the crossing of two separating elements 42 must be known. Based on geometrical considerations, the following expressions are obtained.

$$e_3 = b \cdot \sqrt{(1+e_1^2/e_2^2)}$$

$$e_4 = e_3 \cdot e_2/e_1$$

$$u_1 = e_1 + e_3$$

$$u_2 = e_2 + e_4$$

The resulting dimensions are $e_3$=1.60 mm, $e_4$=1.28 mm, $u_1$=11.6 mm, $u_2$=9.28 mm. The ratios $e_2/e_1$ and $u_2/u_1$ are equal and the value therefore is 0.8.

The dimensions of an expanded sheet are commonly specified by the unit cell dimensions $u_1$, $u_2$ and the width b of the separating element. Under those circumstances, the hydraulic d may be computed as follows:

$$e_1 = u_1 - b \cdot \sqrt{(1+u_1^2/u_2^2)}$$

$$e_2 = e_1 \cdot u_2/u_1$$

$$d = e_1 \cdot e_2/\sqrt{(e_1^2+e_2^2)}$$

As a simplification, when dealing with expanded metal sheet with typical ratios of $e_2/e_1$ below 0.5, the following approximations may be sufficiently accurate to determine the characteristic lengths $e_1$ and $e_2$ based on $u_1$ and $u_2$:

$$e_1 = u_1 - b \cdot u_1/u_2$$

$$e_2 = u_2 - b$$

Furthermore, expanded metal sheet can be characterized by means of the stretching factor, which is defined as $f_s = u_2/2b$. In the current example, its value is $f_s$=4.64.

The area of the unit cell U is $A_u = u_1 \cdot u_2$=107.7 mm². The area of the openings in the unit cell U is $A_o = e_1 \cdot e_2$=2·A=80 mm². The area of the solid portion in the unit cell U is obtained by adding the area of the four separating elements and twice the area of the small rhombus at the crossing of two separating elements:

$$A_b = 2b\sqrt{(e_1^2+e_2^2)} + e_3 \cdot e_4.$$

The resulting area is $A_b$=27.66 mm² and the sum $A_u = A_b + A_o$ is maintained. Within the unit cell U, the ratio of the total area of the openings 40 divided by the total surface area of the layer is $A_o/A_u$=74.3%, which we call the void fraction of the layer. A value close to the void fraction could have been obtained by using the stretching factor as follows $$1-(1/f_s)=78.5\%$$

which is an indication of the raw material savings for a given sheet area if the sheet is stretched.

The physical area of the unit cell U is $A_P = A_b$. The sheet area of the unit cell U is $A_S = A_u$. The geometrical area $A_M$ of the unit cell U is twice the sheet area, which is 2 $A_u$ and 215.4 mm². The specific area $a_M$ is undefined in this context as the shape of the layer is not specified.

Figure 10:
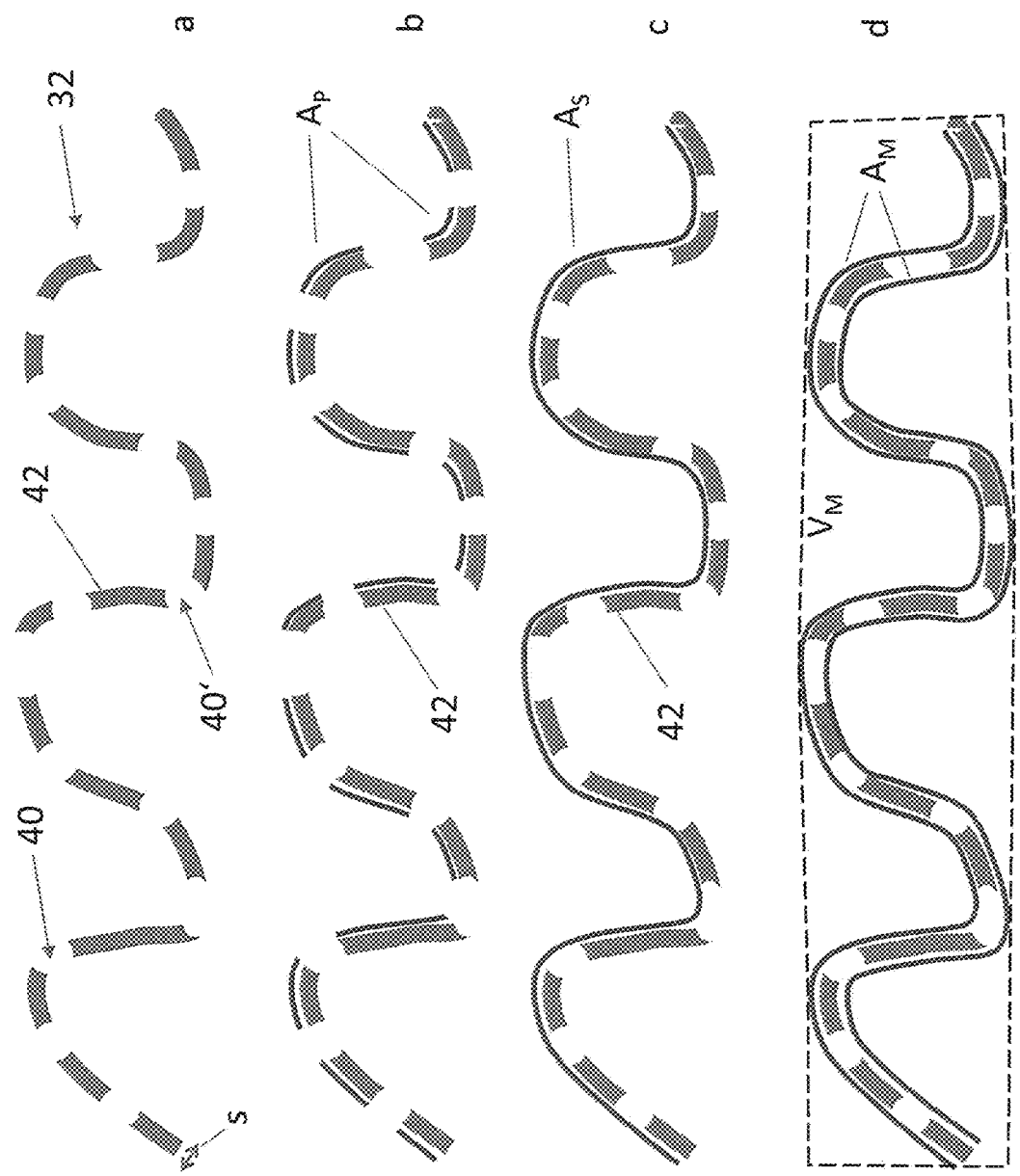
FIGS. 10A-10D show schematic views of the cross-section of a packing layer to illustrate the definitions of the areas $A_P$ (FIG. 10B), $A_S$ (FIG. 10C), $A_M$, $V_M$ and $a_M$ (FIG. 10D).

FIG. 10 shows schematic views of the cross-section of a packing layer in order to explain how to distinguish the various expressions for the area of surfaces. FIG. 10A shows a cross-section of a typical layer of the structured packing element 12. The material forming the separating elements 42 is represented by the black lines, whereas the white portions represent openings 40, 40' in the layer 32, 32'. Each black portion is a cross-section through a separating element 42. The thickness of the black lines represents the layer material thickness s. In FIGS. 10B to 10D the areas on this layer are represented just by thinner lines that follow the layer contour. The physical area $A_P$ of a structured packing layer 32, 32' is shown in FIG. 10B. It is the sum of the surface measured on one selected side of all its separating elements 42. The edges 48, 48' of the separating elements 42 do not contribute to this area. Rather, $A_P$ counts only surface that is physically present. Thus, holes do not contribute to the value. The physical area $A_P$ of the structured packing element 12 is the sum of the physical area $A_P$ of all layers 32, 32' comprised therein. FIG. 10C defines the sheet area $A_S$ of a packing layer. It is obtained by adding both the area of the openings in the layer and the physical area $A_P$ of the layer. The sheet area $A_S$ of the structured packing element 12 is obtained by summing the sheet area $A_S$ of all layers 32, 32' comprised therein. The geometrical area of the layer $A_M$ as defined in FIG. 10D adds up both sides of the layer as if there were no openings 40, 40' or holes. In other words, the geometrical area $A_M$ is approximately obtained by multiplying the sheet area $A_S$ of the packing layers by two, because both sides of the layers account for the geometrical area $A_M$. The specific area $a_M$ is defined as the geometrical area $A_M$ of the structured packing element divided by the volume $V_M$ that the structured packing element occupies.

EXAMPLES AND COMPARATIVE EXAMPLES

Structured packing element 12 as shown in FIG. 2 were tested in a distillation column. The commonly known standard procedure determines the pressure drop over the packing bed and the mass transfer efficiency using a binary mixture under total reflux condition. EP Patent No. 0 995 958 B1 describes such a test with oxygen and argon at a pressure of 22 psia. U.S. Pat. No. 6,874,769 B2 describes to test structured packing elements by using the close-boiling binary mixture para- and ortho-xylene. A binary mixture of similar ideal characteristics as the latter was used in the present disclosure, namely monochlorobenzene (as low-boiler) and ethylbenzene (as high-boiler). Other standard close-boiling ideal binary mixtures to assess the performance of distillation equipment are specified in U. Onken, W. Arlt: "Recommended Test Mixtures for Distillation Columns", 2nd Ed. 1990, The Institution of Chemical Engineers, Rugby, England. ISBN 0-85295-248-1.

The bottom of a distillation column was filled with a sufficient amount of the binary mixture to maintain a decent liquid level during operation of the column. The reboiler was started, a part of the liquid mixture was continuously vaporized, and the vapor rose towards the head of the column. The flow rate of the vapor can be expressed in terms of the factor F and is commonly determined indirectly via the energy balance at the reboiler or at the condenser at the column head. The condenser cooled the vapor such that it condensed back to liquid. Under the preferred total reflux conditions, the entire amount of liquid was sent back to the top of the packing bed, where it was distributed by means of a distributor. The distributor is typically a device comprising channels that receive the liquid and provide an evenly spaced set of orifices through which the liquid can trickle down onto the top packing of the structured packing bed. After trickling through the structured packing bed, the entire amount of liquid was collected at the bottom of the column or at the bottom of the bed by means of a collector from where it was sent back to the bottom of the column. At the bottom the liquid joined the liquid pool from which it was vaporized again. A constant head pressure p was established by controlling the cooling duty of the condenser in combination with a vacuum pump to remove surplus inert gases.

After a certain time of operation at constant reboiler duty a steady state condition was achieved. At this point, the pressure drop over the packing bed and temperatures at relevant points along the column were read, and top and bottom samples of the mixture were taken from the distributor at the top of the packing bed and from the collector at the lower end of the packing bed or from the sump. Several operating points were measured by varying the heat (and cooling) duty, which affects the factor F (vapor flow) and the related liquid flow through the packing bed while the head pressure was kept unchanged. The same experiment was repeated for several settings of the head pressure.

The compositions of the samples were analyzed by means of a calibrated gas chromatograph. The top and bottom samples varied by the amount of low-boiler they contain. More low-boiler, i.e. the compound with the lower boiling temperature, was found in the top sample than in the bottom sample. Once the binary compositions were known, the equation according to Fenske (M. R. Fenske, Ind. Engng. Chem. 24, p. 482, 1932) was applied to determine the number of Theoretical Stages per Meter (NTSM). Sometimes, the inverse value HETP was used, which is called Height Equivalent to a Theoretical Plate.

$$HETP = 1/NTSM$$

A high NTSM (or a low HETP) means a good mass transfer efficiency. The factor F is defined by:

$$F = v_G \cdot \sqrt{\rho_G}$$

wherein $v_G$ is the average velocity of the rising vapor, which can be determined from the mass flow rate via an energy balance at the reboiler. The second variable $\rho_G$ is the vapor density at the relevant vapor/liquid equilibrium. Due to the change in pressure and temperature along the column the vapor density and other physical properties of the fluids varied along the column, but the relevant information is available for the binary mixture. Such variations require to select an appropriate definition of the factor F. It may be determined by means of the properties valid under the conditions at the top or at the bottom of the packing bed. Alternatively, an average value may be computed taking into account the variation over the entire bed. For comparison purpose any of the possible approaches works, provided the same approach is used for all tests.

A high factor F means a high mass flow rate in the column. The value of F that is achievable is usually limited by the flooding which determines the capacity of a packing. Sometimes the capacity factor c is used instead of F, which is obtained by dividing F by the square root of the density difference of the liquid and the vapor.

The pressure drop over the packing bed was another relevant result of the experiment. It was obtained as the difference of the pressure readings at the top and at the bottom of the packing bed after dividing by the bed height $H_B$:

$$\Delta P/\Delta z = (p_{top} - p_{bottom})/H_B$$

Five kinds structured packing elements were used in the examples and comparative examples, which were named P1-250, R-250, P2-500, P3-500 and R-500. While the structured packing elements P1-250 and P2-500 were cross-channel corrugated sheet packings made of layers according to the present disclosure, the structured packing elements P3-500, R-250 and R-500 were reference structured packing elements. More specifically, the structured packing elements R-250 and R-500 were known standard cross-channel corrugated sheet packings with punched holes (leading to approximately 10% void fraction of the layers) and surface texturing as described in GB 1,569,828 and in U.S. Pat. No. 4,981,621, which are commercially distributed under the names Mellapak 250.Y and Mellapak 500.X. All structured packing elements had a height of around 200 mm. The relevant parameters of the aforementioned structured packing elements are summarized in table 1.

TABLE 1

| Parameter | P1-250 | P2-500 | P3-500 | R-250 | R-500 |
|---|---|---|---|---|---|
| Angle of corrugation α | 45° | 30° | 30° | 45° | 30° |
| Specific area $a_M$ (m²/m³) | 250 | 500 | 500 | 250 | 500 |
| Hydraulic diameter d (mm) | 2.46 | 2.46 | 1.54 | | |
| Width of separating element b (mm) | 2 | 2 | 0.7 | | |
| b/d = | 81% | 81% | 45% | | |
| Max. distance D (mm) | 22.5 | 13 | 13 | 22.5 | 13 |
| D/b = | 11.3 | 6.5 | 18.6 | | |
| Side length $a_1$ (mm) | 3.1 | 3.1 | 1.9 | | |
| Longer diagonal $e_1$ (mm) | 5.5 | 5.5 | 3.4 | | |
| Diagonal ratio $e_2/e_1$ | 0.5 | 0.5 | 0.5 | | |
| Grid thickness g (mm) | 1.2 | 1.2 | 0.75 | | |
| Void fraction of the layer | 30% | 30% | 47% | 10% | 10% |
| Layer material thickness s (mm) | 0.1 | 0.1 | 0.1 | 0.1 | 0.1 |
| b/s = | 20 | 20 | 7 | | |
| | present disclosure | | reference | | reference |

Example 1 and Comparative Example 1

Figure 11:
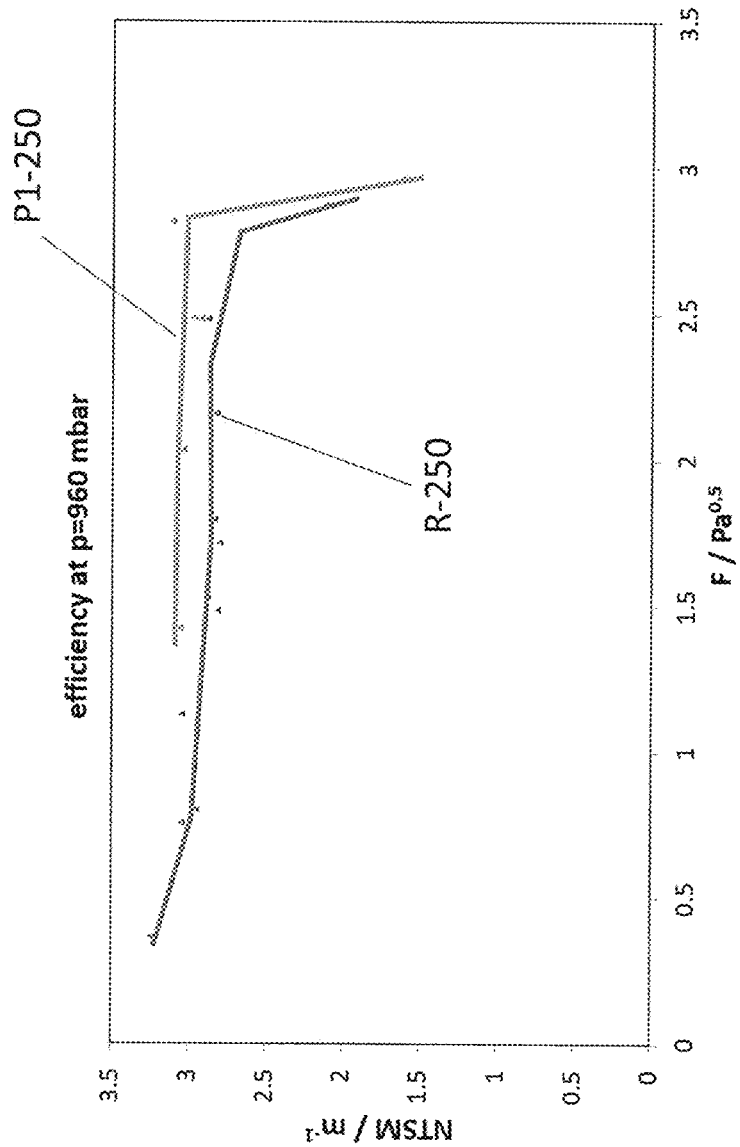
FIG. 11 shows the efficiency curves obtained in example 1 and comparative example 1 for a head pressure of the distillation column of 960 mbar.
Figure 12:
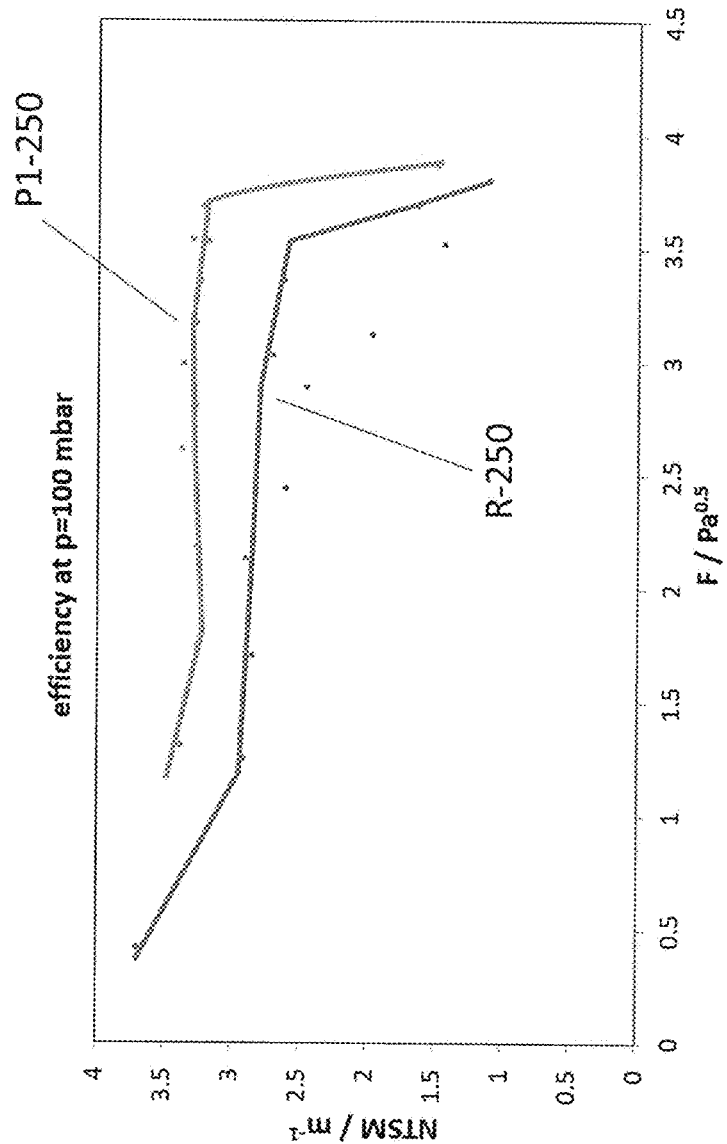
FIG. 12 shows the efficiency curves obtained in example 1 and comparative example 1 for a head pressure of the distillation column of 100 mbar.

The structured packing element according to the disclosure P1-250 and the reference structured packing element R-250 were tested in a distillation column with a 1 m inner diameter at total reflux using monochlorobenzene and ethylbenzene at head pressures of p=960 mbar (close to atmospheric) and p=100 mbar. The packing beds were 4.3 m high. The obtained efficiency curves are shown in FIG. 11 and FIG. 12. In both cases, the structured packing element P1-250 according to the disclosure showed in comparison to the reference structured packing element R-250 a higher mass transfer efficiency (higher NTSM) and even a slightly extended capacity, which is characterized by the factor F, where the efficiency suddenly plummets. It is remarkable and surprising that the structured packing element P1-250 with 30% less material (and 20% less physical area $A_P$) than the reference structured packing element R-250 achieves the better mass transfer result.

Figure 13:
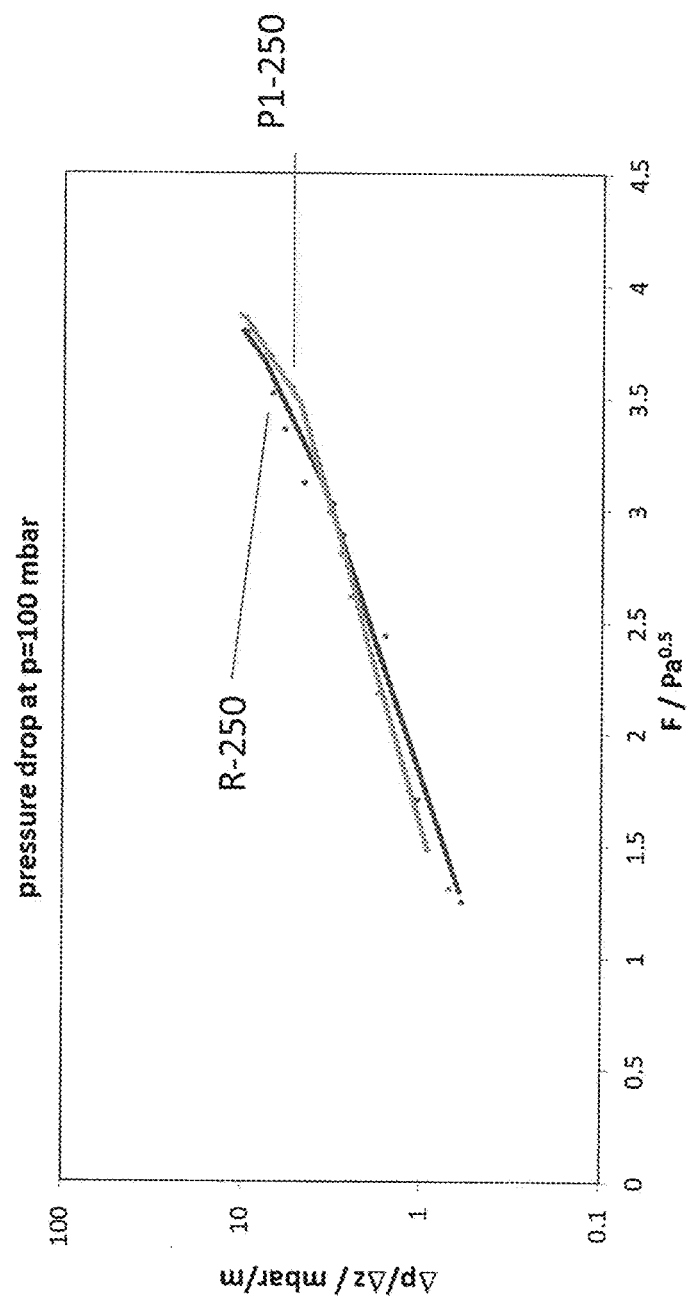
FIG. 13 shows the pressure drops obtained in example 1 and comparative example 1 for a head pressure of the distillation column of 100 mbar.

The pressure drops of both structured packing elements is shown in FIG. 13 and were very similar. Accordingly, the structured packing element P1-250 according to the disclosure had a higher pressure drop at low F-factor, but the slope was lower, which provided the new packing with its capacity advantage and a lower pressure drop at high flow rates.

Example 2 and Comparative Examples 2 to 3

The structured packing element P2-500 according to the disclosure and the reference structured packing element R-500 were tested in a column with a 0.25 m inner diameter at total reflux using monochlorobenzene and ethylbenzene at head pressures of p=960 mbar and p=100 mbar. Furthermore, the structured packing element P3-500 was tested. Despite its similarity with P2-500, structured packing element P3-500 was quite different in as much as significant geometrical parameters are set to values outside the numeric value ranges as specified in the present disclosure. More specifically, for the structured packing element P3-500 the ratio of the average width of the separating elements to the average hydraulic diameter of the adjacent openings b/d was 45% and the ratio of the average width of the separating elements to the layer material thickness b/s was 7, i.e. both of these ratios were outside the numeric value ranges as specified therefore in the present disclosure. The packing beds with P2-500 and P3-500 were 2.4 m high and the packing bed with the reference R-500 had a height of 2.6 m.

Figure 14:
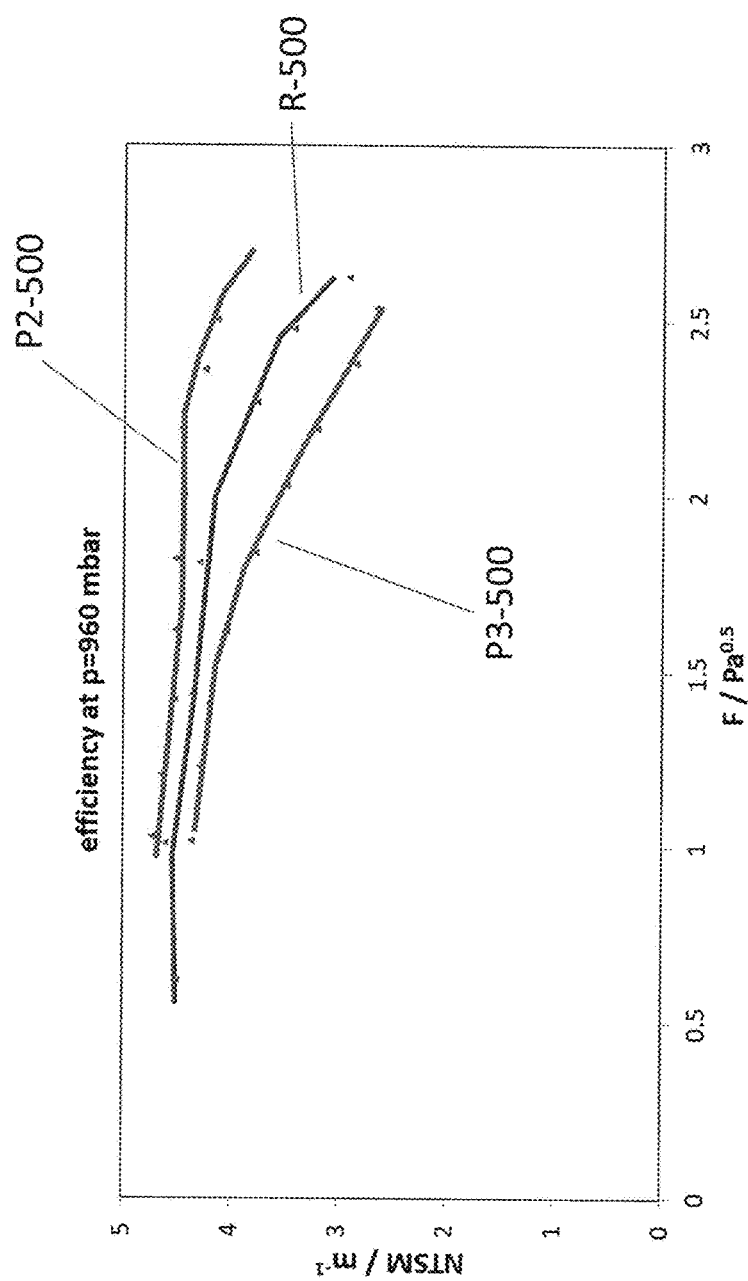
FIG. 14 shows the efficiency curves obtained in example 2 and comparative examples 2 and 3 for a head pressure of the distillation column of 960 mbar.
Figure 15:
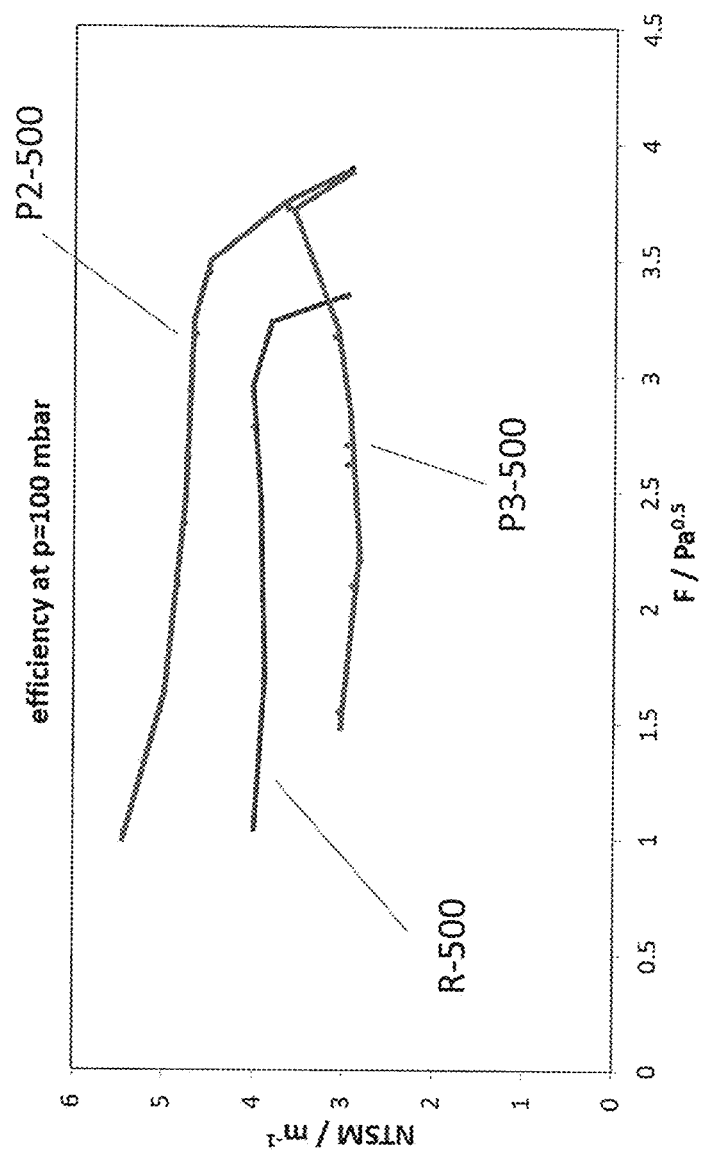
FIG. 15 shows the efficiency curves obtained in example 2 and comparative examples 2 and 3 for a head pressure of the distillation column of 100 mbar.
Figure 16:
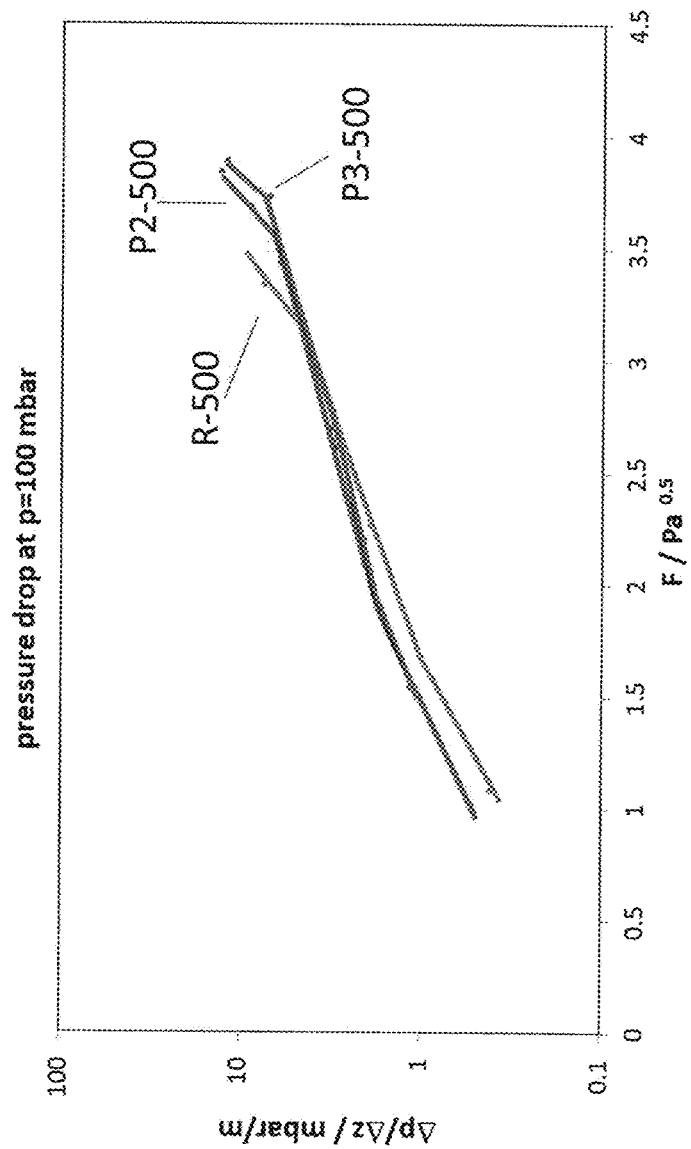
FIG. 16 shows the pressure drops obtained in example 2 and comparative examples 2 and 3 for a head pressure of the distillation column of 100 mbar.

The obtained efficiency curves for these structured packing elements are shown in FIG. 14 and FIG. 15 and the obtained pressure drops for these structured packing elements in FIG. 16.

The better efficiency of the structured packing element P2-500 according to the present disclosure in comparison to the structured packing elements P3-500 and R-500 can be easily derived in FIGS. 14 and 15 for both, a head pressure of 960 mbar as well as a head pressure of 100 mbar. The spread in mass transfer efficiency is especially striking at the low head pressure. Interestingly, P3-500 has a nice capacity, but the efficiency is significantly below that of R-500. Both structured packing elements P2-500 and P3-500 have initially a higher pressure drop than that of R-500, but as F increases, they gain advantage and the higher capacity of both can also be recognized in this graph.

The invention claimed is:

1. A structured packing element for a column for at least one of mass transfer and heat exchange between a heavy fluid phase and a light fluid phase, the structured packing element comprising:
   at least two layers of a grid comprising openings that are surrounded and separated from each other by separating elements,
   wherein at least two of the at least two layers are arranged in a longitudinal direction of the packing element parallel and in touching contact with each other such that an open space extending from one end to an opposite end of the at least two layers is provided between the at least two layers such that at least one of the heavy fluid phase and the light fluid phase may flow therethrough [,
   wherein an average width of at least 50% of the separating elements between adjacent ones of the openings is at least 15 times a layer material thickness and is between 70% and 125% of an average hydraulic diameter of the adjacent ones of the openings,
   wherein a maximum distance between at least two of the at least two layers measured in a plane perpendicular to the longitudinal direction is at least 4 times larger than the average width of the separating elements, and
   wherein the average width of one of the separating elements is determined by dividing up the one of the separating elements into individual sections each having a section length di, for each of the individual sections a shortest distance bi between adjacent edges within the individual sections is measured and a sum of products di·bi is divided by a sum of di to yield the average width of the one of the separating elements, and the layer material thickness is a thickness of a material of one of the at least two layers and is measured at an outer edge of the at least two layers with a micrometer screw.

2. The structured packing element according to claim 1, wherein the average width of at least 75% of the separating elements between adjacent ones of the openings is between 70% and 125% of the average hydraulic diameter of the adjacent ones of the openings.

3. The structured packing element according to claim 1, wherein the average width of at least 50% of the separating elements between adjacent ones of the openings is 1.5 to 4 mm.

4. The structured packing element according to claim 1, wherein the maximum distance between at least 50% of the at least two layers measured in the plane perpendicular to the longitudinal direction is 4 to 15 times larger than the average width of the separating elements.

5. The structured packing element according to claim 1, wherein for at least 50% of the at least two layers, a ratio of a total area of the openings divided by a sheet area of the at least two layers is between 20% and 38%.

6. The structured packing element according to claim 5, wherein for each of the at least two layers, the ratio of the total area of the openings divided by the sheet area of the at least two layers is between 20% and 38%.

7. The structured packing element according to claim 1, wherein at least 50% of the openings of each of the at least two layers have a hydraulic diameter that is between 50 and 150% of the average hydraulic diameter of all of the openings.

8. The structured packing element according to claim 1, wherein a hydraulic diameter of at least 50% of the openings of each of the at least two layers is 1.25 to 5 mm.

9. The structured packing element according to claim 1,
wherein at least 50% of the openings have a rectangular or quadrilateral cross-section,
wherein shorter characteristic lengths of the rectangles or quadrangles are 1 to 4 mm,
wherein longer characteristic lengths of the rectangles or quadrangles are 2 to 8 mm, and
wherein the average width of the separating elements between adjacent rectangles is 1.5 to 4 mm.

10. The structured packing element according to claim 1,
wherein at least 50% of the openings have a rectangular or quadrilateral cross-section,
wherein a ratio of shorter characteristic lengths of the rectangles or quadrangles divided by longer characteristic lengths of the rectangles or quadrangles is 0.4 to 0.7.

11. The structured packing element according to claim 1, wherein the maximum distance between each of the at least two layers measured in the plane perpendicular to the longitudinal direction is at most 15 times larger than the average hydraulic diameter of the openings.

12. The structured packing element according to claim 1,
wherein at least 50% of the at least two layers comprise periodic deformations, and
wherein the open space between the at least two layers is defined by the periodic deformations.

13. The structured packing element according to claim 12,
wherein the periodic deformations are corrugations comprising a plurality of alternately oriented peaks and valleys,
wherein the peaks of one of the at least two layers contact the valleys of an adjacent one of the at least two layers and the valleys of one of the at least two layers contact the peaks of an adjacent one of the at least two layers, and
wherein adjacent ones of the at least two layers are oriented such that the peaks and valleys of the adjacent ones of the at least two layers intersect in crisscross fashion with the peaks and valleys of the ones of the at least two layers extending obliquely relative to the longitudinal direction.

14. A mass transfer column comprising at least one structured packing element according to claim 1.

* * * * *